(12) United States Patent
Tomida

(10) Patent No.: US 6,662,678 B2
(45) Date of Patent: Dec. 16, 2003

(54) SHIFT DEVICE, SHIFT DEVICE BASE, AND SHIFT LEVER SUPPORT STRUCTURE

(75) Inventor: Shigetoshi Tomida, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 7 days.

(21) Appl. No.: 09/976,373

(22) Filed: Oct. 11, 2001

(65) Prior Publication Data

US 2002/0040615 A1 Apr. 11, 2002

(30) Foreign Application Priority Data

| Oct. 11, 2000 | (JP) | ................................ 2000-310636 |
| Oct. 11, 2000 | (JP) | ................................ 2000-310637 |
| Oct. 11, 2000 | (JP) | ................................ 2000-310638 |
| Oct. 11, 2000 | (JP) | ................................ 2000-310639 |

(51) Int. Cl.$^7$ ................................................. G05G 1/04
(52) U.S. Cl. ........................................................ 74/523
(58) Field of Search ............................ 74/523, 527, 532

(56) References Cited

U.S. PATENT DOCUMENTS 5,309,783 A * 5/1994 Doolittle et al. ......... 74/473.21
5,445,046 A * 8/1995 Kataumi et al. ............... 74/527
5,456,133 A * 10/1995 Sogo et al. .................... 74/526
6,148,686 A * 11/2000 Kataumi .................. 74/473.18
6,286,385 B1 * 9/2001 Nishimura et al. ......... 74/473.3

FOREIGN PATENT DOCUMENTS

JP          08-334167         12/1996

* cited by examiner

Primary Examiner—Thomas R. Hannon
Assistant Examiner—Vicky A. Johnson
(74) Attorney, Agent, or Firm—Crompton, Seager & Tufte, LLC

(57) ABSTRACT

A device for shifting an automatic transmission of a vehicle is provided. The shift device includes a shift lever and a case. The shift lever is moved among a plurality of shift positions. The case receives a lower portion of the shift lever. The housing accommodates the lower portion of the shift lever and has a guide hole that guides the movement of the shift lever. The case includes a housing and a base, which is formed integrally with the housing and is attached to the vehicle.

23 Claims, 21 Drawing Sheets

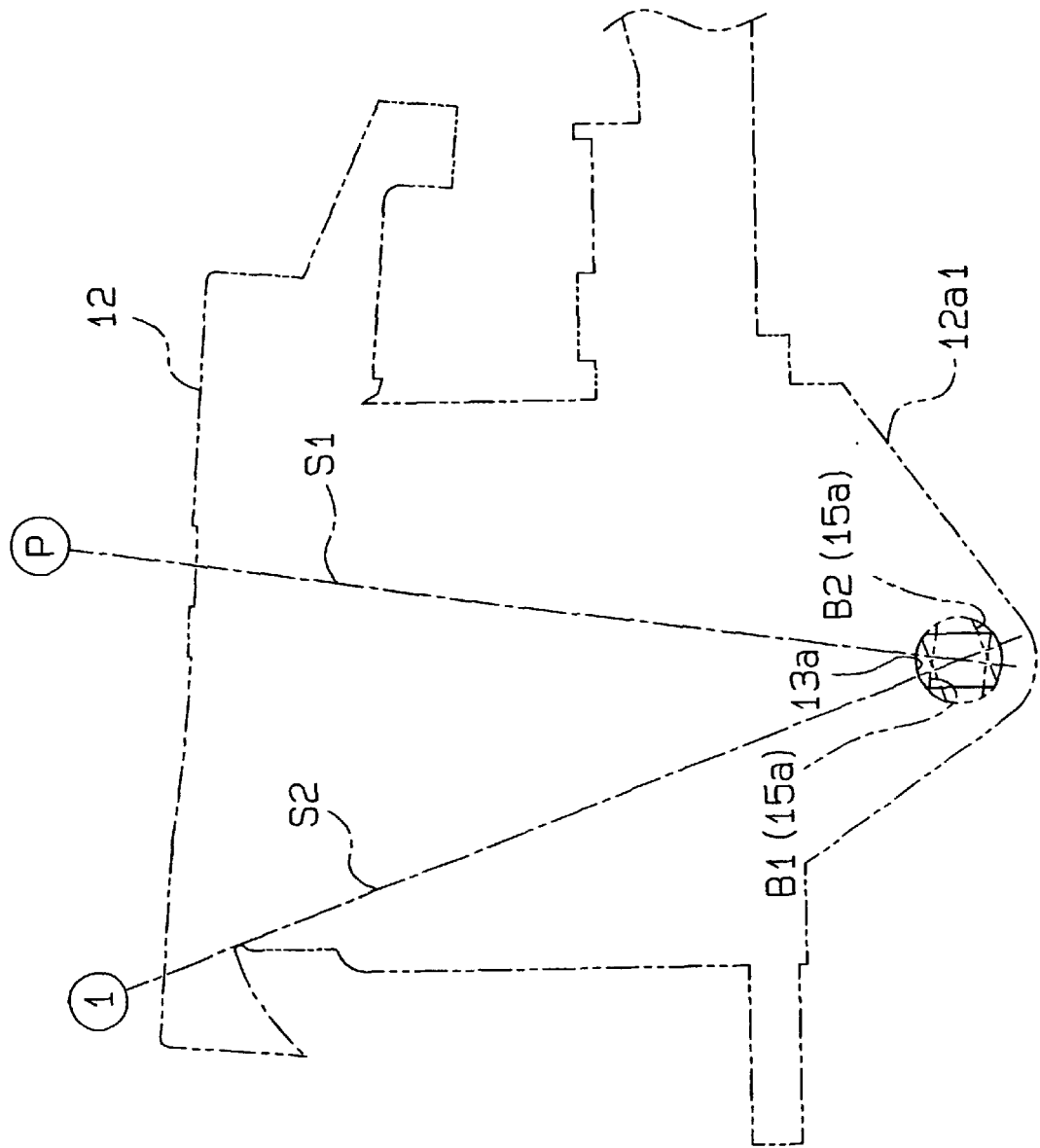

US 6,662,678 B2

SHIFT DEVICE, SHIFT DEVICE BASE, AND SHIFT LEVER SUPPORT STRUCTURE

BACKGROUND OF THE INVENTION

The present invention relates to shift devices, and, more particularly, to shift devices for automatic transmissions of vehicles.

Generally, an automatic transmission of a vehicle is connected to a shift device. The shift device includes a lever manipulated by a driver to shift the transmission.

FIGS. 1 to 3 show a prior art shift device 71. The shift device 71 includes a shift lever 74 (see FIG. 2), which is manipulated by a driver, a base 72, and a housing 73. The base 72 is secured to a vehicle body and the housing 73 accommodates a lower portion of the lever 74.

As shown in FIGS. 1 and 3, the housing 73 is secured to the base 72 with a bolt 75 and a nut 76. A pair of bearing pieces 77a, 77b project downward from the bottom of the base 72. The bearing pieces 77a, 77 b include shaft holes 78a, 78b, respectively. The shaft holes 78a, 78b support a shaft 80. A C-ring 79 is fitted around the distal end of the shaft 80.

As shown in FIGS. 2 and 3, the shaft 80 rotationally supports a sleeve 81. The sleeve 81 includes a cable connector 81a that projects upward from the sleeve 81. The cable connector 81a has a cylindrical projection, which is parallel with the axis of the sleeve 81. The projection rotationally supports a wire 82a of a control cable 82. Movement of the shift lever 74 is transmitted to an automatic transmission (not shown) through the wire 82a. The sleeve 81 includes a pin connector 81b that projects downward from the sleeve 81. The pin connector 81b has a pin hole 81c, which is perpendicular to the axis of the sleeve 81.

The pin hole 81c rotationally supports a rotary shaft 84. A C-ring 83 is fitted around the distal end of the rotary shaft 84. The shift lever 74 has a yoke at its base, which includes a pair of yoke members. One yoke member is located between the pin connector 81b and the proximal end of the rotary shaft 84, and the other is located between the pin connector 81b and the C-ring 83. This structure enables the shift lever 74 to pivot with respect to the rotary shaft 84 and the shaft 80.

The shift lever 74 includes a shift rod 74a. A shift knob is attached to the distal end of the shift rod 74a. A distal portion of the shift rod 74a projects upward from the housing 73 through a guide groove 85.

As shown in FIG. 1, the guide groove 85 is formed in an upper wall of the housing 73. The guide groove 85 guides movement of the shift rod 74a.

A positioner 73a is formed along an inner wall of the housing 73. The positioner 73a includes a plurality of convex and concave portions that alternate with one another. The positioner 73a is located at one side of the guide groove 85.

The shift lever 74 has a movable pin holder 86 for holding a movable pin 88 and a spring 87. The spring 87 urges the movable pin 88 toward the positioner 73a such that the distal end of the movable pin 88 abuts against the positioner 73a. If the shift lever 74 is manipulated, the movable pin 88 moves along the positioner 73a in accordance with the shape of the positioner 73a. The movable pin 88 and the positioner 73a form a first positioning mechanism for positioning the shift lever 74 in a fore-and-aft direction of the vehicle.

A second positioner 90 and a second movable pin (not shown) laterally position the shift lever 74. The second positioner 90 is located separate from the first positioner 73a.

A cable holder 89 is formed at the front end of the base 72 to hold the control cable 82.

In the shift device 71, the housing 73 and the base 72 are formed separately in independent molds. Further, the shift lever 74 is formed separately from the sleeve 81. Also, in addition to the sleeve 81 that connects the shift lever 74 to the shaft 80, the shift device 71 employs the C-ring 79 to prevent the shaft 80 from escaping from the bearing pieces 77a, 77b. In other words, a relatively large number of components support the shift lever 74. This complicates the manufacturing process of the shift device 71 and increases the manufacturing costs.

Japanese Unexamined Patent Publication No. 8-334167 describes a shift device that has an electric device such as a shift locking solenoid. The solenoid is mounted on the base. Thus, if liquid enters the interior of the shift device, the electric device is exposed to the liquid, which can damage the electric device.

BRIEF SUMMARY OF THE INVENTION

Accordingly, it is a first objective of the present invention to provide an inexpensive shift device with fewer parts.

It is a second objective of the present invention to provide a shift device that protects an electric device installed in the shift device from liquid.

To achieve the foregoing and other objectives and in accordance with the purpose of the present invention, the invention provides a shift device for shifting an automatic transmission of a vehicle. The shift device includes a shift lever and a case. The shift lever is moved among a plurality of shift positions. The case receives a lower portion of the shift lever. The case includes a housing and a base. The housing accommodates the lower portion of the shift lever and has a guide hole that guides the movement of the shift lever. The base is formed integrally with the housing and is attached to the vehicle.

A further perspective of the present invention is a shift device for shifting an automatic transmission of a vehicle. The shift device includes a shift lever, a cable connector, a case, and a positioning mechanism. The shift lever is moved among a plurality of shift positions. The cable connector is connected to a control cable that transmits the movement of the control cable to the automatic transmission. The cable connector is formed integrally with the shift lever. The case receives a proximal portion of the shift lever and the cable connector. The positioning mechanism permits the shift lever to be manipulated accurately. The positioning mechanism includes a positioning surface located in the case and a positioning component located in the shift lever. The positioning surface includes a plurality of concave portions. The positioning component is pressed against the positioning surface.

A further perspective of the present invention is a base for a shift device with an electric component. The base is secured to a vehicle body. The base includes an accommodating portion. The accommodating portion is formed integrally with the base for accommodating the electric component. The accommodating portion includes a top plate that covers at least an upper portion of the electric component. The electric component is secured to the top plate.

A further perspective of the present invention is a support structure for rotationally supporting a shift lever that shifts an automatic transmission of a vehicle. A case receives a proximal portion of the shift lever. The support structure includes a support shaft, an engagement piece, and first and second bearing pieces. The support shaft has a distal end and a proximal end and is connected to a proximal end of the shift lever. The engagement piece is formed integrally with the support shaft and projects radially from the support shaft. The first and second bearing pieces are located in the case and rotationally support the support shaft. At least one bearing piece has a slit for accommodating the engagement piece and an attachment hole connected to the slit. A step is formed between the slit and the attachment hole. The engagement piece moves in the slit when the support shaft rotates around the axis of the support shaft. The support shaft becomes inseparable from the first and second bearing pieces through the attachment hole when the engagement piece engages with the step at a predetermined engagement position in the slit. The support shaft becomes separable from the first and second bearing pieces through the attachment hole when the engagement piece is located at a position other than the engagement position in the slit.

A further perspective of the present invention is a shift device for shifting an automatic transmission of a vehicle. The shift device includes a shift lever, a cable connector, a case, and a positioning mechanism. The shift lever is moved among a plurality of shift positions. The cable connector is formed integrally with the shift lever and is connected to a control cable that transmits the movement of the shift lever to the automatic transmission. The case receives a proximal portion of the shift lever and the cable connector. The case includes a housing and a base. The housing accommodates a portion of the shift lever and has a guide hole that guides the movement of the shift lever. The base is formed integrally with the housing and is attached to the vehicle. The positioning mechanism enables the shift lever to be manipulated accurately. The positioning mechanism includes a positioning surface located in the case and a positioning component located in the shift lever. The positioning surface has a plurality of concave portions for positioning the shift lever. The positioning component is pressed against the positioning surface.

BRIEF DESCRIPTION OF THE DRAWINGS

FIG. 19 is a diagram showing shift lever positions of the shift device of FIG. 16 in association with positions of a support shaft;

DETAILED DESCRIPTION OF THE PREFERRED EMBODIMENTS

Figure 11:
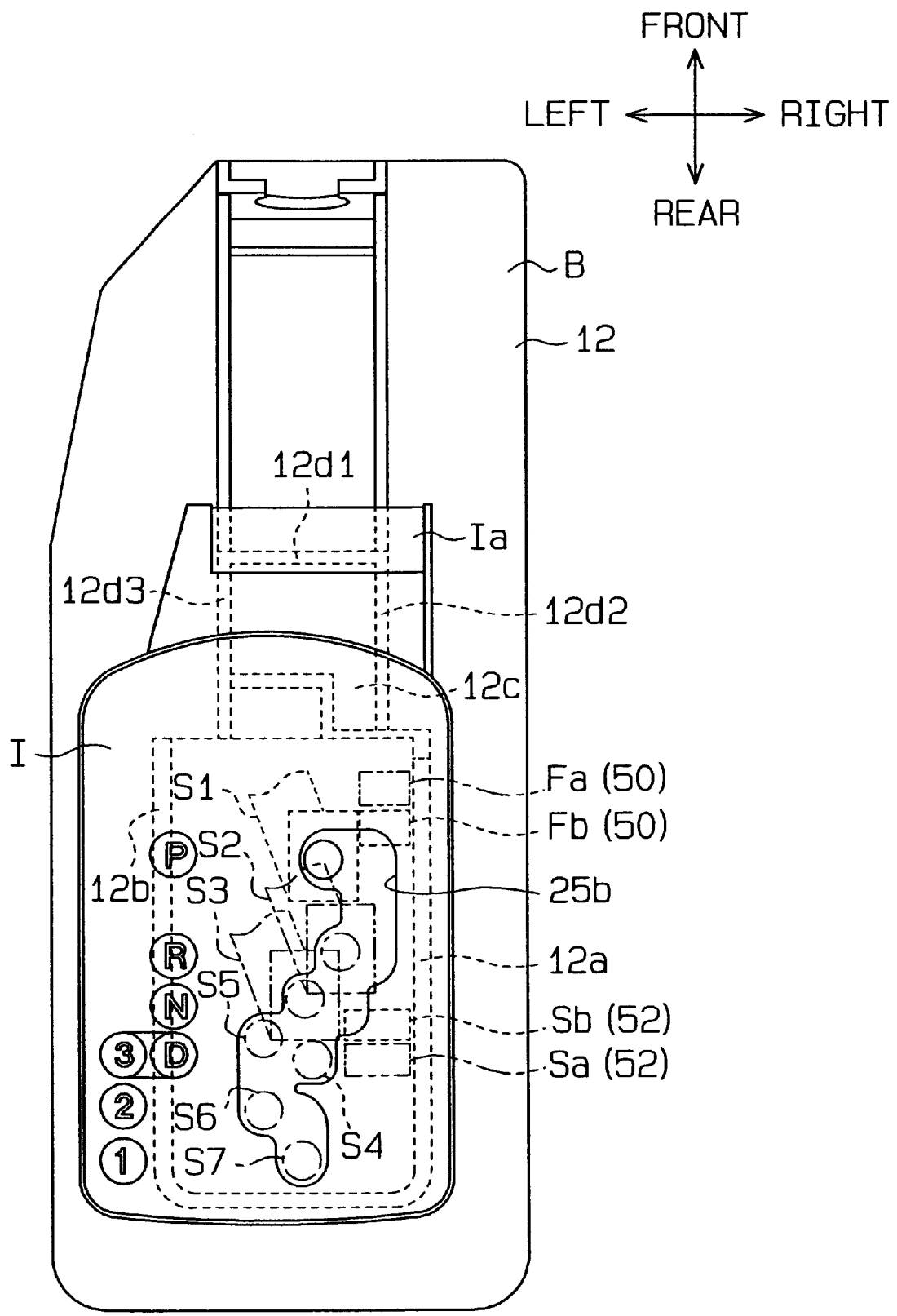
FIG. 11 is a plan view showing the case of FIG. 6 and the cover of FIG. 7.

A shift device 11 of a first embodiment according to the present invention will now be described. The shift device 11 is, for example, a gate type shift device by which an automatic transmission of a vehicle is shifted. In the following description, the fore-and-aft direction and leftward and rightward directions, or the lateral directions, of the shift device 11 are indicated by the arrows of FIG. 11.

Figure 6:
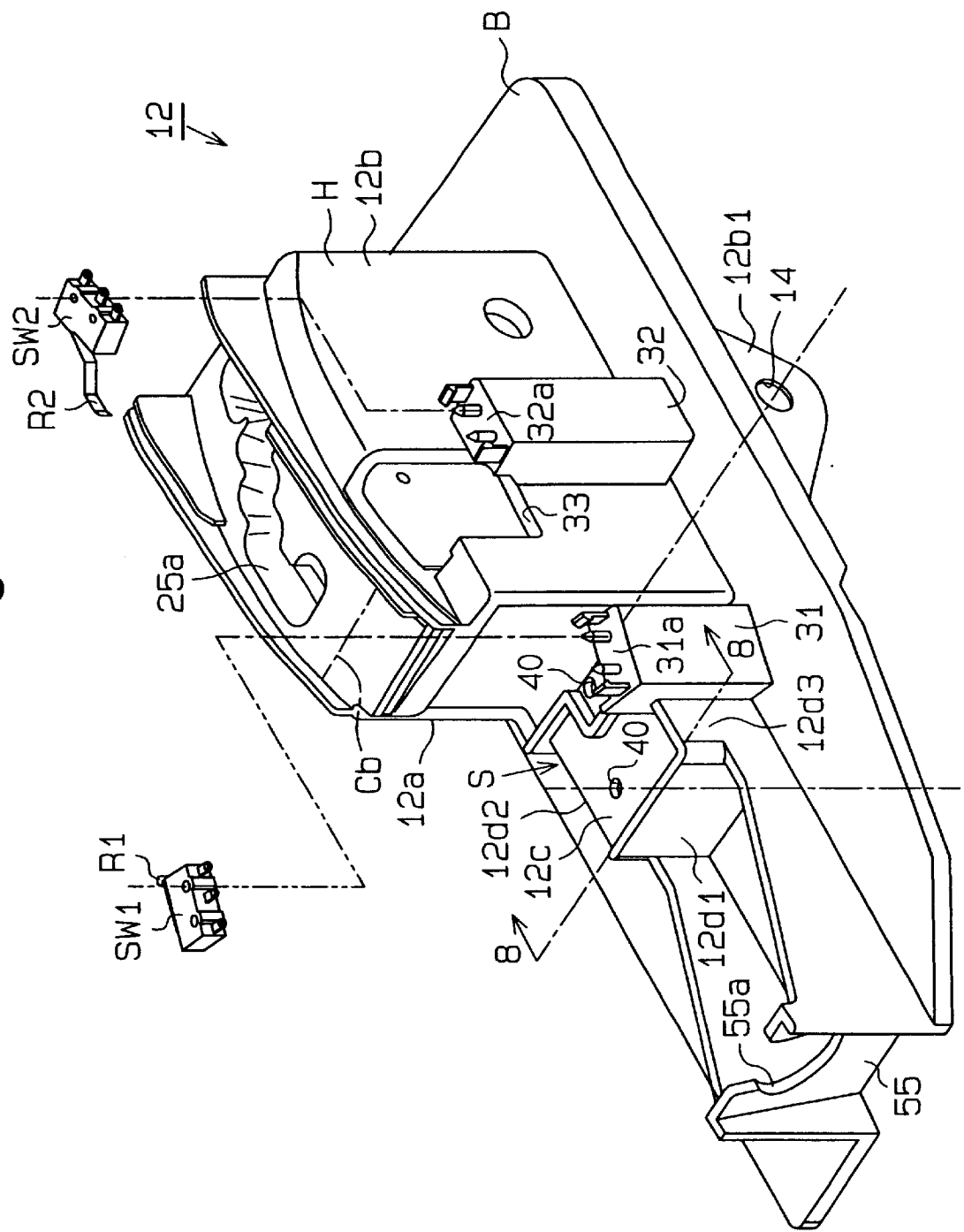
FIG. 6 is a perspective view showing a case of the shift device of FIG. 4.

As shown in FIG. 6, the shift device 11 has a case 12 that is secured to a vehicle floor (not shown). The case 12 includes a base B and a housing H, which is formed integrally with the base B. It is preferred that the case 12 is formed of synthetic resin.

Figure 5:
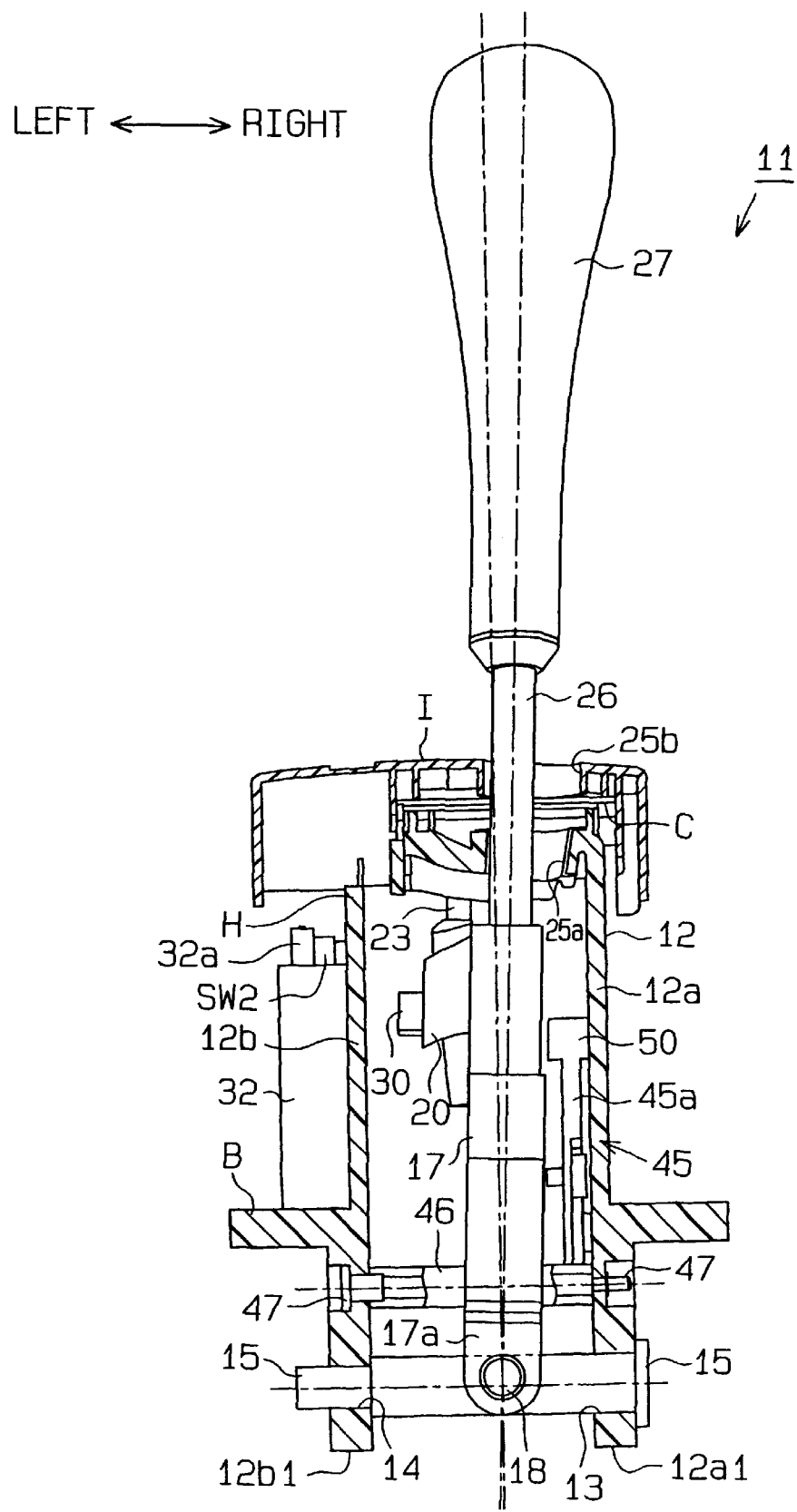
FIG. 5 is a lateral cross-sectional view showing the shift device of FIG. 4.

The housing H has a right wall 12a and a left wall 12b that oppose each other. As shown in FIG. 5, a pair of bearing pieces 12a1, 12b1 project downward from the bottom of the base B. The bearing pieces 12a1, 12b1 have shaft holes 13, 14, respectively. The shaft holes 13, 14 rotationally support a support shaft 15.

Figure 9:
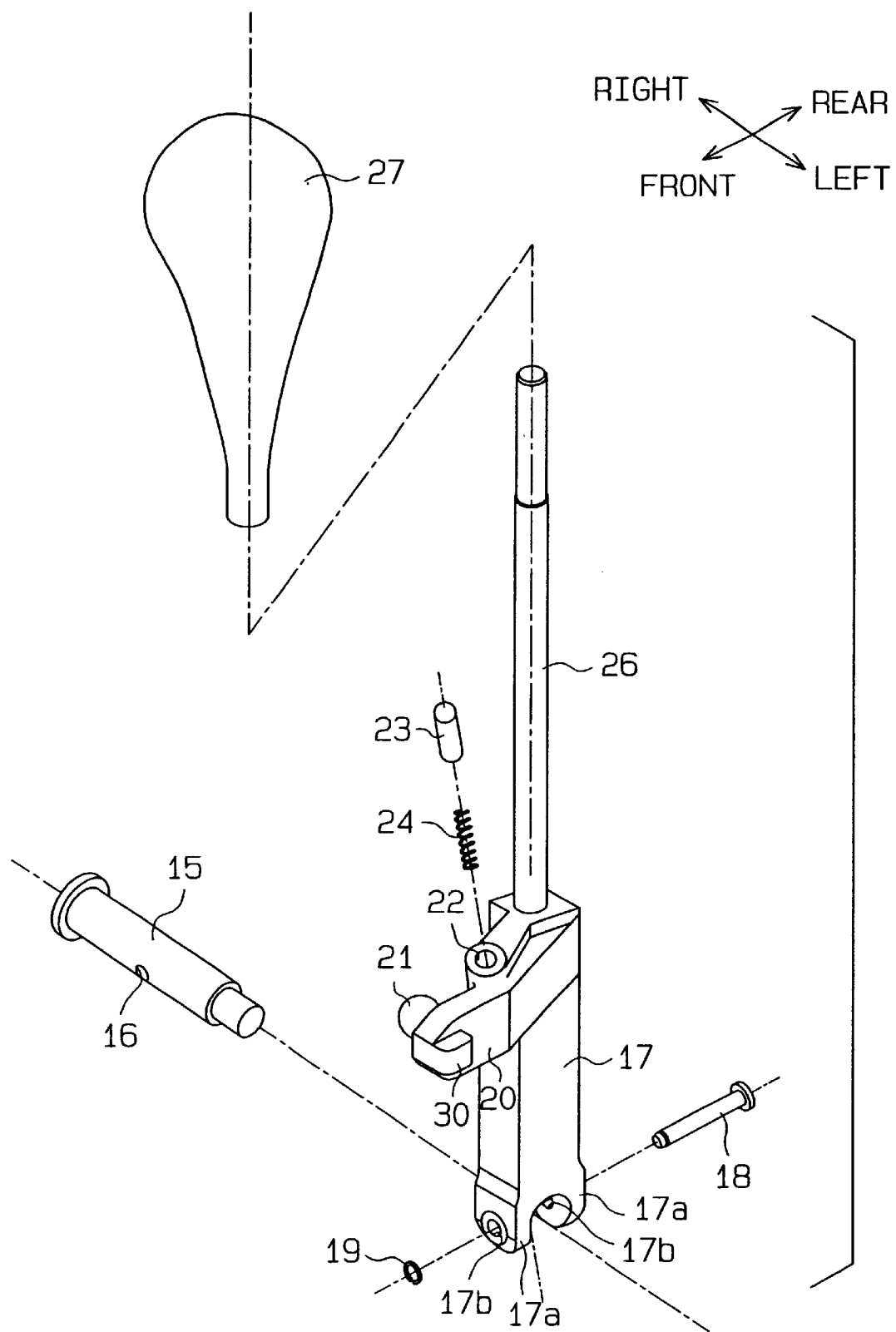
FIG. 9 is an exploded perspective view showing a shift lever of the shift device of FIG. 4.

As shown in FIG. 9, the support shaft 15 has a pin hole 16 perpendicular to the axis of the support shaft 15. A shift lever 17 has a forked base, or a pair of yoke members 17a that hold the support shaft 15. Each yoke member 17a has a pin hole 17b.

The yoke members 17a hold the support shaft 15. A pin 18 is passed through the pin holes 17b of the yoke members 17a and the pin hole 16 of the support shaft 15. A C-ring 19 is fitted around the distal end of the pin 18 to prevent the pin 18 from escaping from the pin holes 16, 17b. The support shaft 15 and the pin 18 thus support the shift lever 17 such that the shift lever 17 pivots with respect to the case 12.

As shown in FIG. 9, a projection 20 is formed integrally with the shift lever 17 to project in a front left direction. A spherical cable connector 21 is formed at one side of the projection 20 and a switch pressing portion 30 is formed at the other. It is preferred that the switch pressing portion 30 is formed integrally with the shift lever 17. An accommodating hole 22 is formed in the top of the projection 20 to accommodate a movable pin 23 and a coil spring 24, which urges the movable pin 23 upward.

Figure 1:
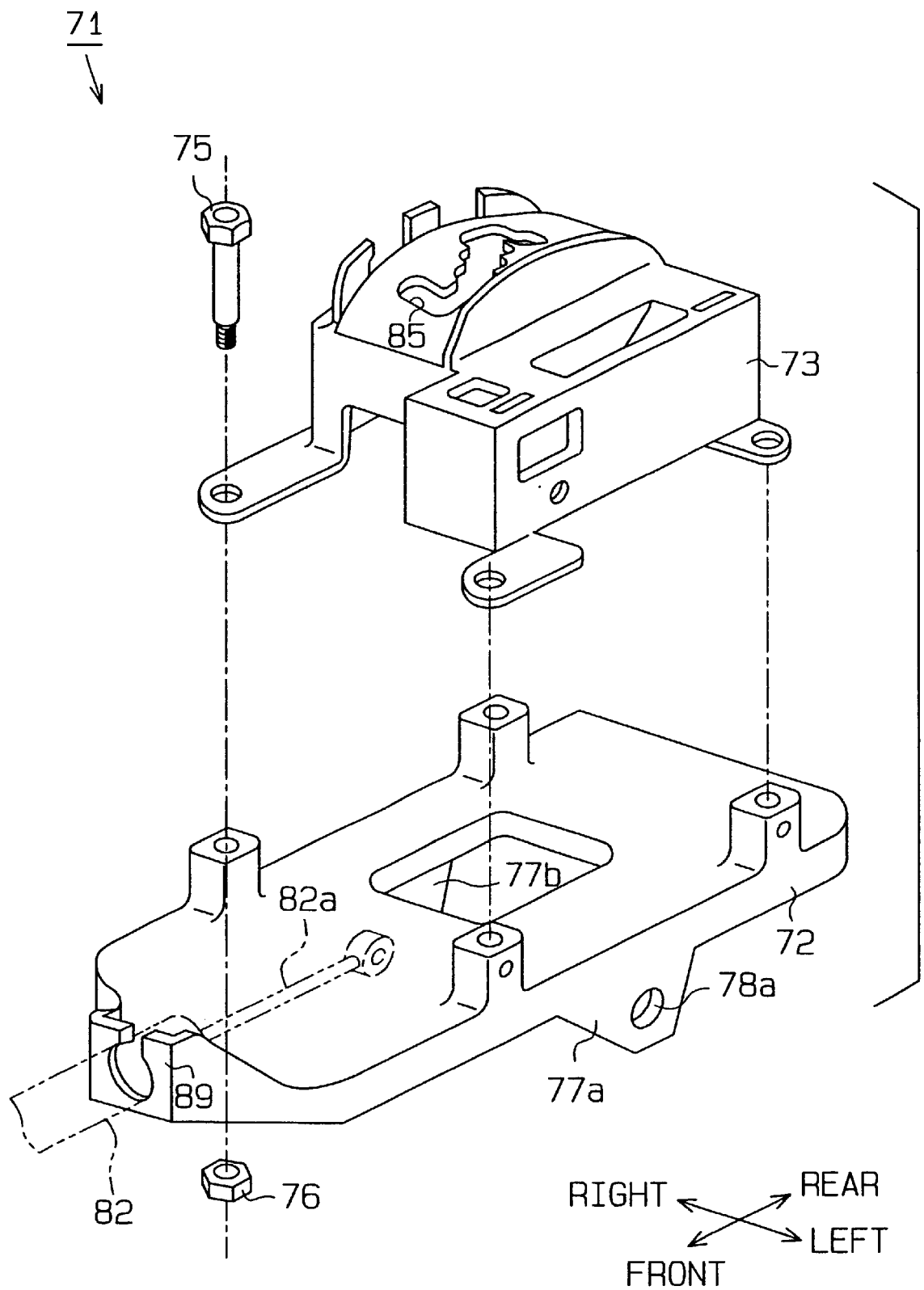
FIG. 1 is an exploded perspective view showing a housing and a base of a prior art shift device.
Figure 2:
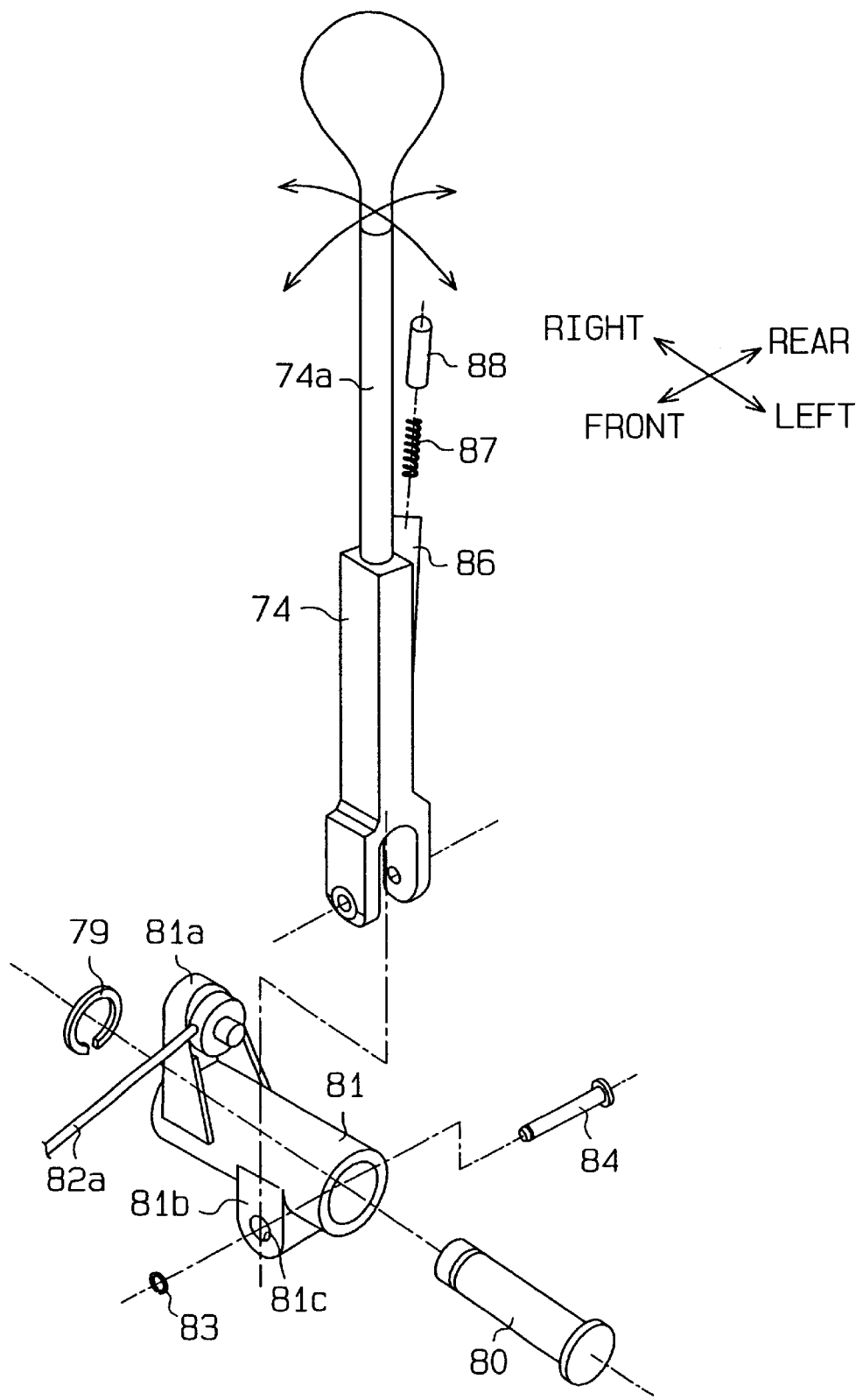
FIG. 2 is an exploded perspective view showing a shift lever of the shift device of FIG. 1.
Figure 3:
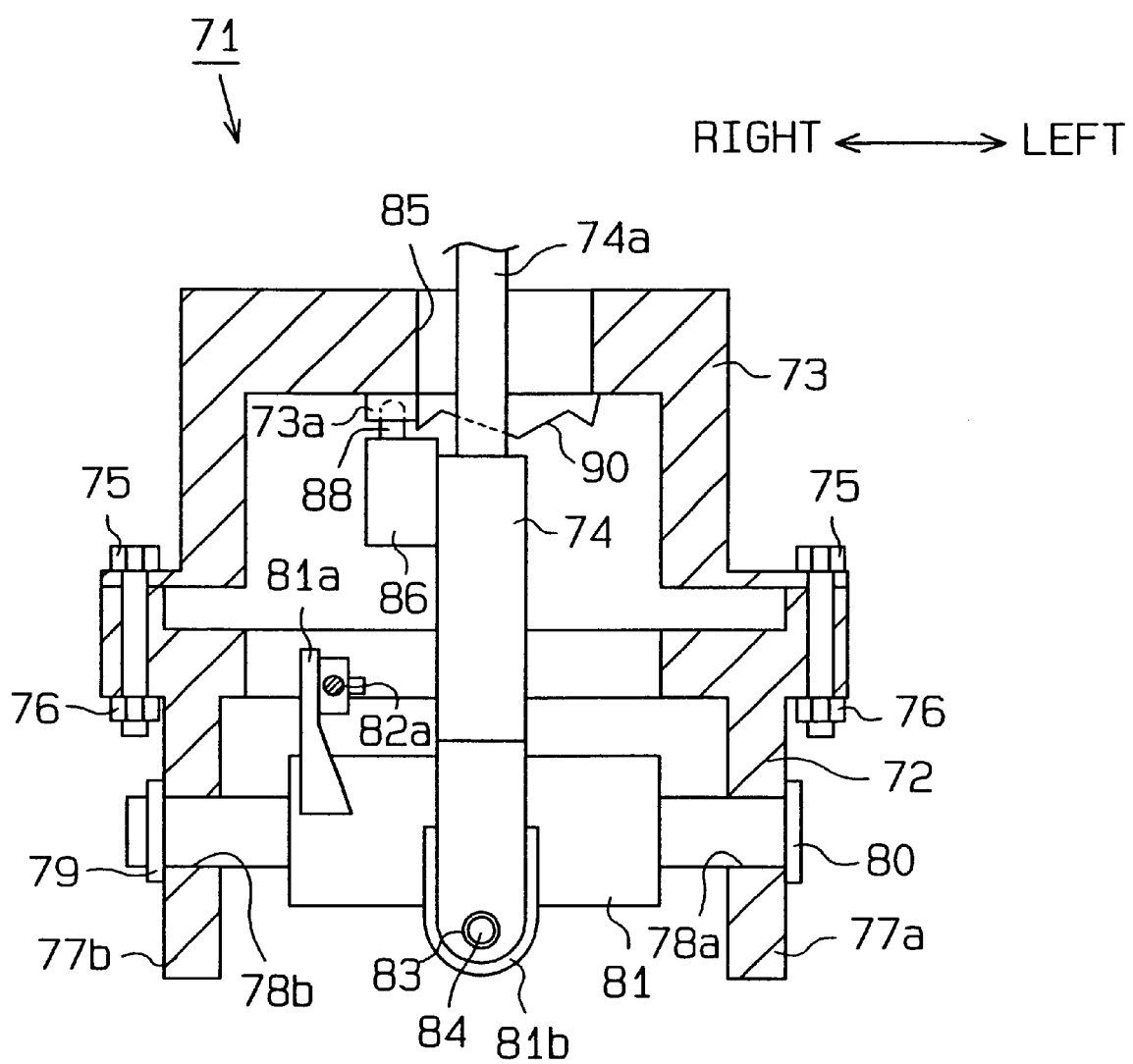
FIG. 3 is a partial cross-sectional view of the shift device of FIG. 1.
Figure 4:
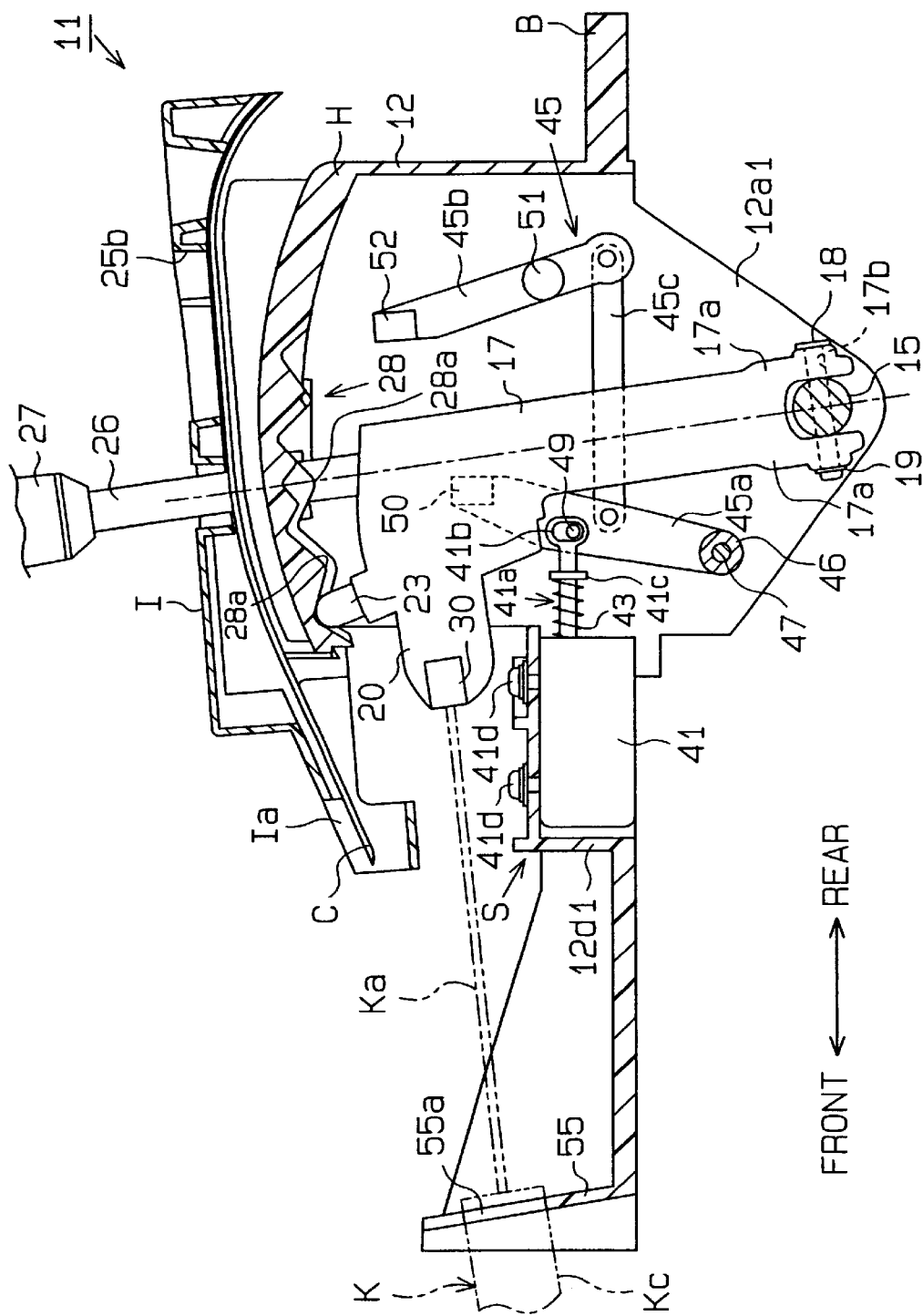
FIG. 4 is a vertical cross-sectional view showing a shift device of a first embodiment according to the present invention.

As shown in FIGS. 4 and 5, the shift lever 17 includes a shift rod 26. A shift knob is attached to the distal end of the shift rod 26. The shift rod 26 projects upward from the case 12 through a pair of guide holes 25a, 25b. A cover I of FIG. 7, which is ornamental, is attached to the top of the housing H.

Figure 7:
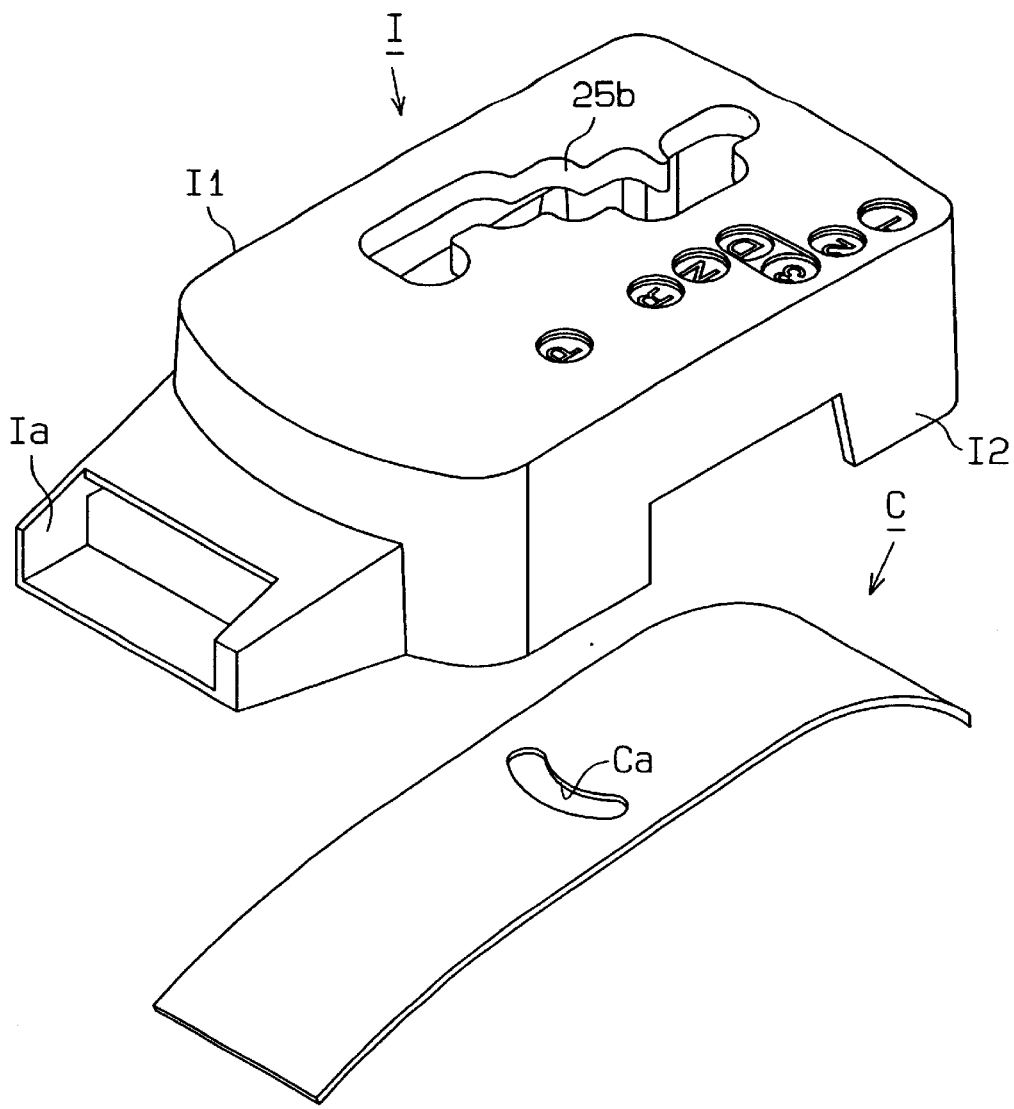
FIG. 7 is a perspective view showing a cover and a cover sheet of the shift device of FIG. 4.
Figure 8:
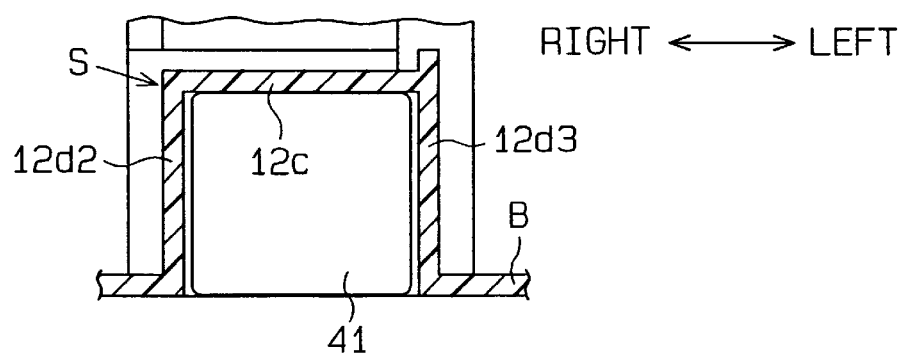
FIG. 8 is a cross-sectional view taken along line 8-8 of FIG. 6.

As shown in FIG. 6, the guide hole 25a is formed in the top of the housing H. As shown in FIG. 7, the guide hole 25b is formed in the top of the cover I. The guide holes 25a, 25b are identical and form a predetermined guide path. Indicia including the symbols "P","R","N", "D", "3", "2", and "1" are located on the top of the cover I in accordance with the shape of the guide path. As shown in FIG. 11, a left wall I2 of the cover I is spaced from the left wall 12b of the housing H. The shift lever 17 pivots in the guide hole 25b to one of "P" position S1, "R" position S2, "N" position S3, "D" position S4, "3" position S5, "2" position S6, and "1" position S7.

A positioning surface 28 will be described with reference to FIGS. 4 and 10. The positioning surface 28 is formed on the lower side of the top wall of the housing H. The positioning surface 28 includes a plurality of convex portions 28a, a plurality of concave portions 28b1, 28b2, 28b3, 28b4, 28b5, and 28b6, a plurality of convex portions 28c1, 28c2, 28c3, 28c4, 28c5, and 28c6, and a plurality of concave portions 28d1, 28d2, 28d3, 28d4, 28d4', and 28d5.

Figure 10:
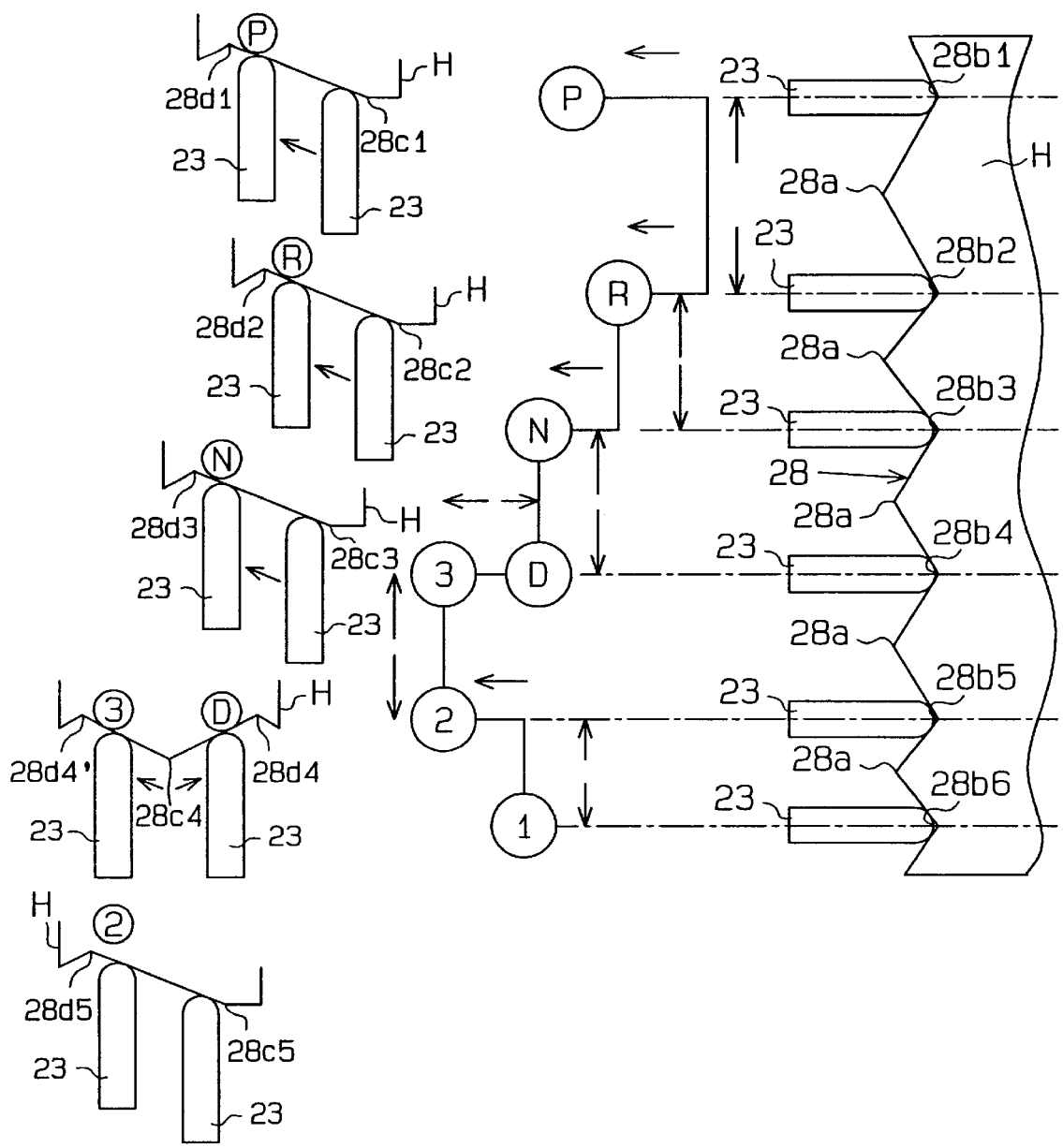
FIG. 10 is a diagram showing shift positions of the shift device of FIG. 4 in association with positions of a movable pin.

As shown at the right side of FIG. 10, the convex portions 28a and the concave portions 28b1-28b6 alternate with one another in the fore-and-aft direction of the shift device 11. The concave portions 28b1-28b3 respectively correspond to the "P" position S1, the "R" position S2, and the "N" position S3. The concave portion 28b4 corresponds to the "D" position S4 and the "3" position S5. The concave portions 28b5, 28b6 respectively correspond to the "2" position S6 and the "1" position S7. Thus, when the shift rod 26 is shifted among these positions S1 to S7, the distal end of the movable pin 23 follows the movement of the shift rod 26 and contacts a corresponding convex portion 28 and a corresponding concave portion 28b1-28b6.

The left side of FIG. 10 shows cross sections of the concave portions 28b1-28b5. The cross section of the concave portion 28b6 is not illustrated. Each concave portion 28b1-28b5 has a surface that extends in a lateral direction of the shift device 11. More specifically, the concave portions 28b1, 28b2, 28b3, and 28b5, which respectively correspond to the positions S1, S2, S3, and S6, are inclined laterally in the shift device 11. The convex portions 28c1, 28c2, and 28c3 are formed at the right side of the concave portions 28b1, 28b2, and 28b3, respectively. The concave portions 28d1, 28d2, and 28d3 are formed at the left side of the concave portions 28b1, 28b2, and 28b3, respectively.

The concave portion 28b4, which corresponds to the "D" position S4 and the "3" position S5, has the convex portion 28c4. The convex portion 28c4 is located approximately at the lateral middle of the shift device 11. The concave portions 28d4, 28d4' are formed at opposite lateral sides of the convex portion 28c4.

When the shift rod 26 is located at any one of the positions S1–S6, the distal end of the movable pin 23 is located at the corresponding concave portion 28b1–28b5. In this state, the coil spring 24 urges the movable pin 23 toward the inclined surface between the associated convex portion 28c1–28c5 and the adjacent concave portion 28d1–28d5, thus laterally moving the shift rod 26 toward the nearest concave portion 28d1–28d5. The lateral movement of the shift rod 26 is restricted by abutment between the shift rod 26 and the wall of each guide hole 25a, 25b. When the shift rod 26 abuts against the wall of each guide hole 25a, 26a, the distal end of the movable pin 23 is located immediately adjacent to the corresponding concave portion 28d1–28d5. The shift rod 26 is thus held in this state.

If the shift rod 26 is operated, the movable pin 23 moves in accordance with the shape of the surface 28. When the movable pin 23 is moving toward any convex portion 28a or the convex portion 28c4, the movable pin 23 is temporarily accommodated in the accommodating hole 22 against the force of the coil spring 24. Once the movable pin 23 moves beyond the corresponding convex portion 28a, 28c4, the movable pin 23 projects from the accommodating hole 22. The shift rod 26 is positioned when the distal end of the movable pin 23 is located at the adjacent concave portion 28b1–28b6.

As shown in FIGS. 4 and 6, a solenoid accommodating portion S is formed integrally with the base B and is located at the front side of the housing H. The solenoid accommodating portion S includes a top plate 12c, a front plate 12d1, a right plate 12d2, and a left plate 12d3. The top plate 12c is substantially parallel with the base B and the front plate 12d1 is perpendicular to the base B. The rear end of the top plate 12c is located rearward from the front end of the top of the housing H. The top plate 12c, the front plate 12d1, the right plate 12d2, and the left plate 12d3 are formed as one body to constitute liquid-resistant walls of the solenoid accommodating portion S.

The top plate 12c has through holes 40. An electric component (an electromagnetic solenoid) 41 is inserted in the solenoid accommodating portion S from below the base B. A screw 41d is passed through each through hole 40 to secure the solenoid 41 to the top plate 12c of the solenoid accommodating portion S. In this manner, the solenoid accommodating portion S accommodates the solenoid 41. It is preferred that the bottom of the solenoid S is flush with the bottom of the base B or is located higher than the bottom of the base B.

As shown in FIG. 7, a cover sheet C is located between the housing H and the cover I of the case 12 to prevent an object from entering the case 12 through the guide holes 25a, 25b. The cover sheet C has an opening Ca through which the shift rod 26 extends. It is preferred that the opening Ca has an elongated curved shape to enable the shift lever 17 to move laterally. When the shift lever 17 moves in the fore-and-aft direction, the cover sheet C moves together with the shift lever 17, thus sliding between the top of the housing H and the bottom of the cover I.

As shown in FIG. 4, when the shift rod 26 is located at the "P" position S1, the front end of the cover sheet C projects from an opening Ia of the cover C. When the shift rod 26 is located at the "N" position S3 or the "D" position S4 or the "3" position S5, the front end of the cover sheet C is located above the top plate 12c.

When the shift rod 26 is located at the "2" position S6 or the "1" position S7, the front end of the cover sheet C is located at a position indicated by the broken line Cb of FIG. 6. That is, even if the shift rod 26 is located at the rearmost position, the cover sheet C closes the guide holes 25a.

The solenoid 41 includes a plunger 41a. The plunger 41a has a ring 41b at its distal end and a flange 41c at its intermediate position. A spring 43 is fitted between the proximal end of the plunger 41a and the flange 41c. When the solenoid 41 is excited, the plunger 41a moves to a forward predetermined position against the force of the spring 43. In contrast, when the solenoid 41 is de-excited, the spring 43 urges the plunger 41a to a rearward predetermined position.

As shown in FIG. 5, a crank mechanism 45, or a shift locking mechanism, is formed along the inner side of the right wall 12a of the housing H. As shown in FIG. 4, the crank mechanism 45 has a first link 45a, a second link 45b, and a third link 45c.

A pipe portion 46 is formed at the lower end of the first link 45a. A pivot 47 is passed through the pipe portion 46 and is supported by the bearing pieces 12a1, 12b1. The first link 45a thus pivots with respect to the pivot 47. A projection 49 projects from the middle of the first link 45a to engage with the ring 41b of the plunger 41a. A first interfering portion 50 is formed at the upper end of the first link 45a.

The second link 45b is spaced rearward from the first link 45a. A securing pin 51 is secured to the right wall 12a of the housing H to pass through the middle of the second link 45b. The securing pin 51 thus rotationally supports the second link 45b. A second interfering portion 52 is formed at the upper end of the second link 45b. One end of the third link 45c is connected to the middle of the first link 45a, and the other is connected to the lower end of the second link 45b. The third link 45c thus rotates relative to the first link 45a and the second link 45b.

Figure 12:
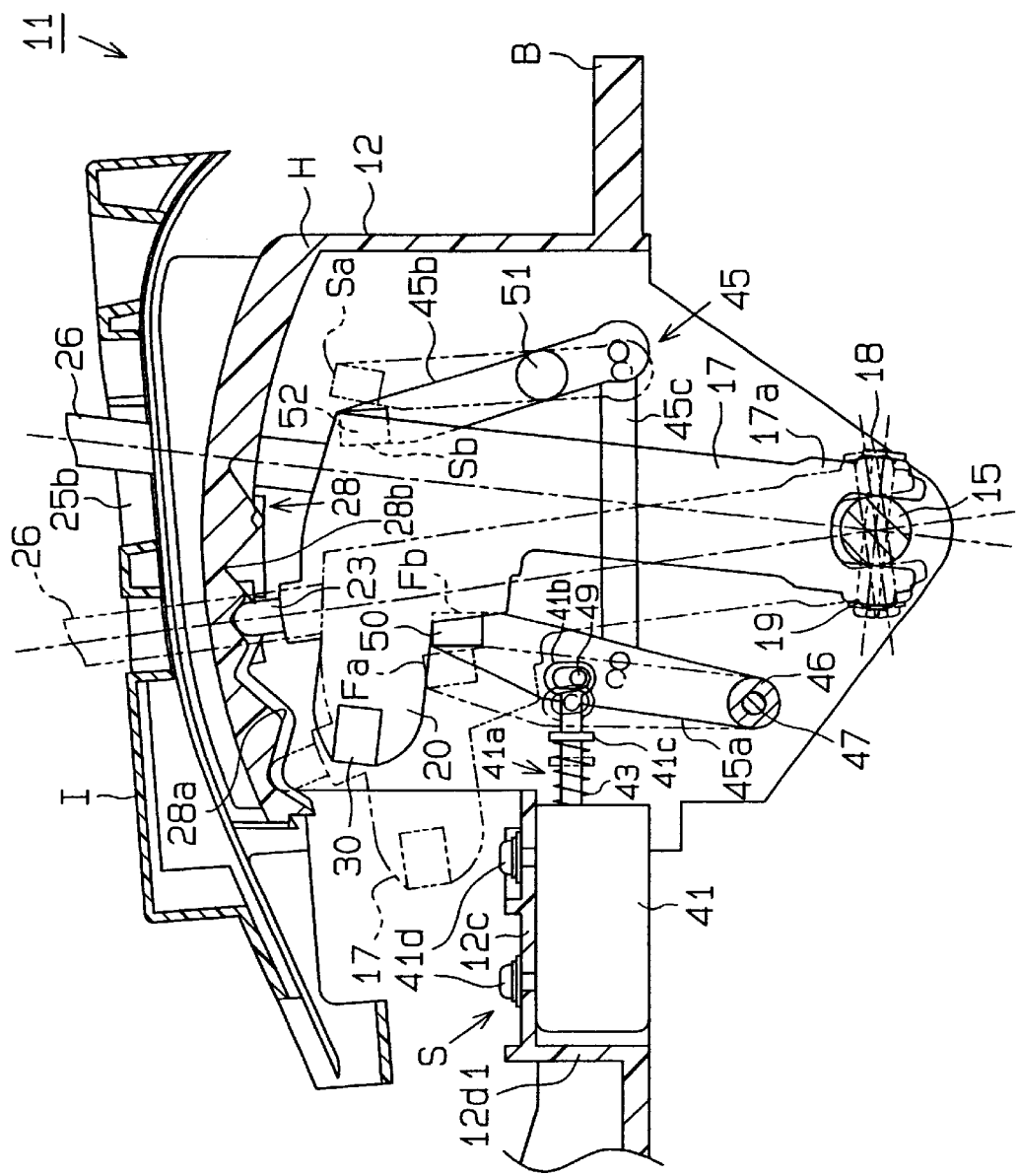
FIG. 12 is a side view, partially in cross section, showing a crank mechanism of the shift device of FIG. 4.

The shift locking mechanism will be described with reference to FIGS. 11 and 12.

The solenoid 41 is excited if the ignition switch is turned on, the vehicle speed is lower than a predetermined value, and the brake pedal is depressed. Otherwise, the solenoid 41 remains de-excited.

If the solenoid 41 is excited, the plunger 41a moves forward and the first interfering portion 50 moves to a first non-interfering position Fa and the second interfering portion 52 moves to a second non-interfering position Sa.

In contrast, if the solenoid 41 is de-excited, the plunger 41a moves rearward. The first interfering portion 50 moves to a first interfering position Fb and the second interfering portion 52 moves to a second interfering position Sb.

When the shift lever 17 is located at the "P" position S1 and the first interfering portion 50 is located at the first interfering position Fb, the first interfering portion 50 abuts against the shift lever 17 and the right wall 12a of the housing H. The shift lever 17 is thus locked at the "P" position S1.

When the shift lever 17 is located at the "N" position S3 and the second interfering portion 52 is located at the second interfering position Sb, the second interfering portion 52 abuts against the shift lever 17 and the right wall 12a. This prevents the shift lever 17 from moving from the "N" position S3 to the "R" position S2.

If the shift lever 17 is located at the "R" position S2 and the first interfering portion 50 is located at the first interfering position Fb, moving the shift lever 17 to the "P" position S1 moves the first interfering portion 50 forward. The first interfering portion 50 thus reaches the first non-interfering position Fa and moves the plunger 41a forward through the crank mechanism 45. In this manner, the shift lever 17 is moved from the "R" position S2 to the "P" position S1.

If the shift lever 17 is located at the "R" position S2 and the second interfering portion 52 is located at the second interfering position Sb, moving the shift lever 17 to the "N" position S3 moves the second interfering portion 52 rearward. The second interfering portion 52 thus reaches the second non-interfering position Sa and moves the plunger 41a rearward through the crank mechanism 45. In this manner, the shift lever 17 is moved from the "R" position S2 to the "N" position S3.

The connection between the shift device 11 and a control cable K will be described with reference to FIGS. 4, 13, 14A, and 14B.

A support wall 55 is formed at the front end of the base B and has a circular opening 55a. The support wall 55 and the opening 55a form a cable holder.

Figure 13:
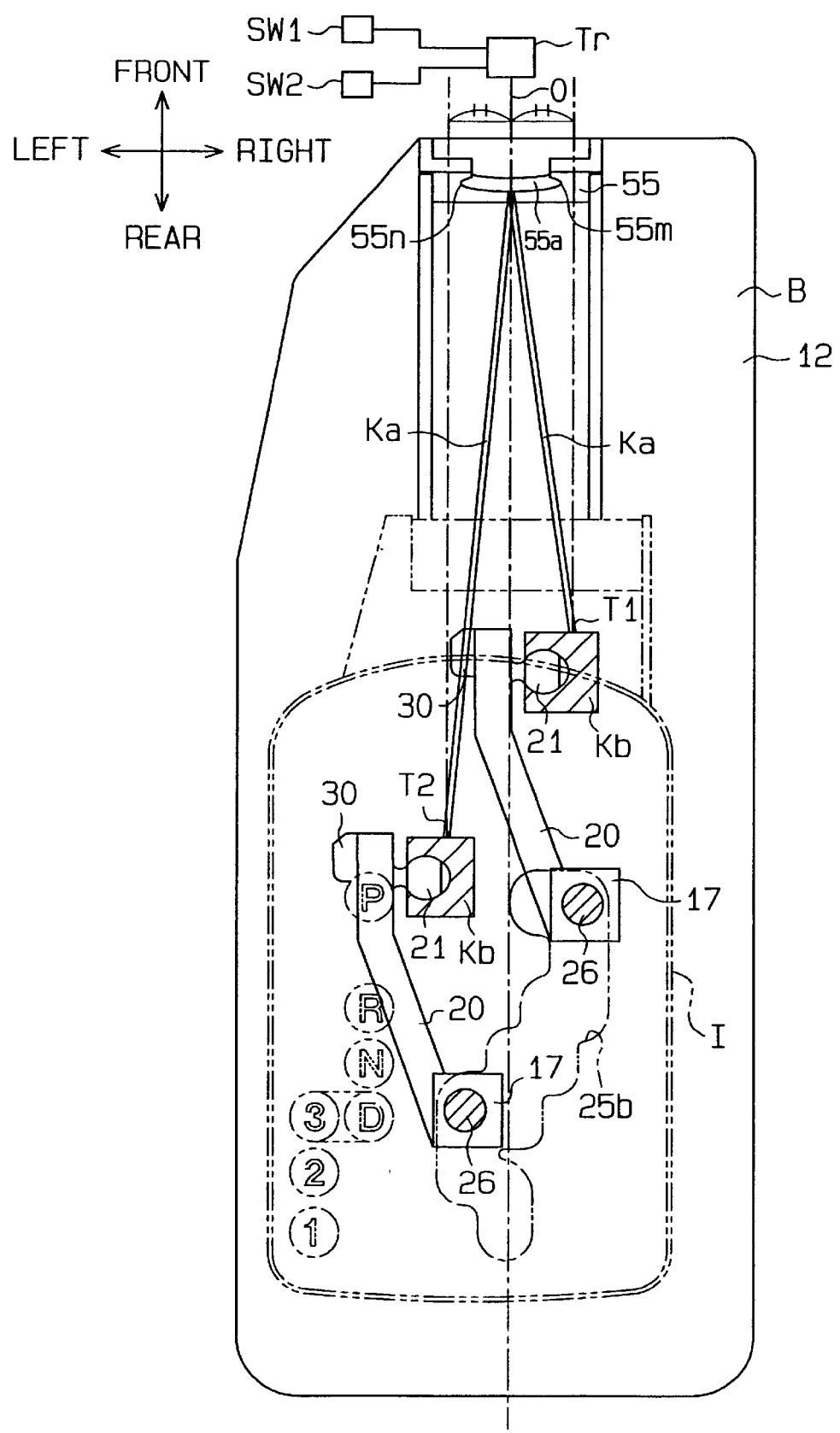
FIG. 13 is a diagrammatic plan view showing shift lever positions of the shift device of FIG. 4 in association with positions of an inner cable.

The control cable K is connected to an automatic transmission Tr and includes an inner cable Ka and an outer tube Kc that encompasses the inner cable Ka. The opening 55a holds one end of the outer tube Kc. The distal end of the inner cable Ka is connected to the cable connector 21. More specifically, as shown in FIG. 13, a connecting portion Kb is attached to the distal end of the inner cable Ka. The connecting portion Kb has a recess that accommodates the cable connector 21 of the shift lever 17. The cable connector 21 rotates relative to the connecting portion Kb.

The proximal end of the inner cable Ka is connected to an automatic transmission (not shown). Movement of the shift lever 17 is transmitted to the automatic transmission through the inner cable Ka.

Figure 14:
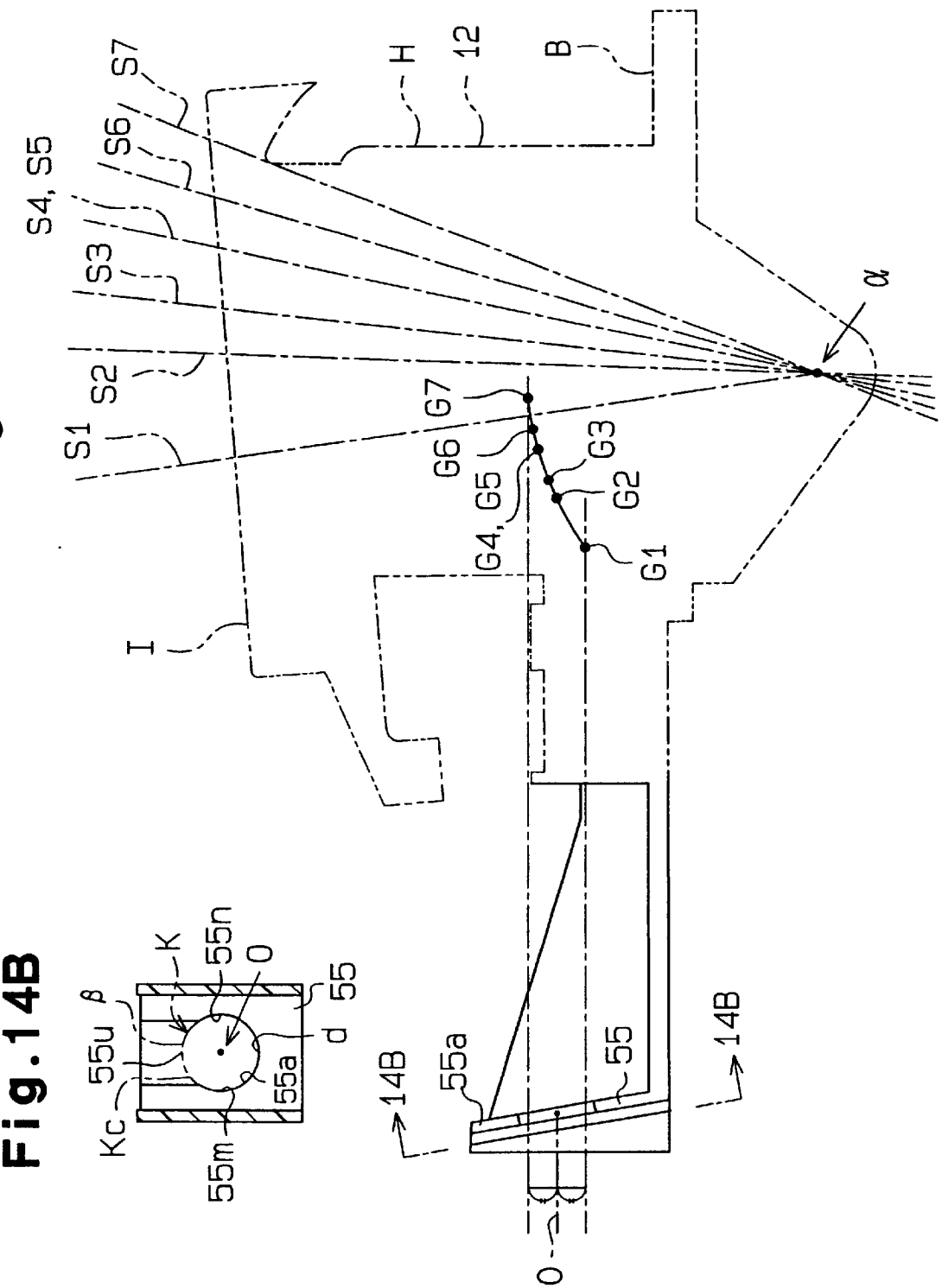
FIG. 14A is a diagrammatic plan view showing shift lever positions of the shift device of FIG. 4 in association with positions of an inner cable.
FIG. 14B is a cross-sectional view taken along line 14B-14B of FIG. 14A.

As shown in FIG. 14B, when the control cable K is held in the opening 55a, the axis of the control cable K corresponds to the center of the opening 55a. The center of the opening 55a corresponds to a reference line O.

The position of the distal end of the inner cable Ka will hereafter be described.

As shown in FIG. 13, when the shift lever 17 is located at a right position of the "P" position S1, the distal end of the inner cable Ka is located at a rightmost point T1. If the shift lever 17 is located at the "3" position S5, the distal end of the inner cable Ka is located at a leftmost point T2. Further, as shown in FIG. 14A, when the shift lever 17 is located at the "1" position S7, the distal end of the inner cable Ka is located at a height G7. If the shift lever 17 is located at the "P" position S1, the distal end of the inner cable Ka is located at a height G1.

The position of the opening 55a is selected as follows.

As shown in FIG. 14B, a left end 55m and a right end 55n of the opening 55a correspond to the left end and the right end of the outer tube Kc, respectively. The position of the opening 55a is selected such that the reference line O corresponds to a point approximately halfway between the point T1 and the point T2.

Further, a hypothetical upper end 55u of the opening 55a is located on a hypothetical circle β. The hypothetical upper end 55u and a lower end d of the opening 55a correspond to the upper end and the lower end of the outer tube Kc, respectively. The position of the opening 55a is selected such that the reference line O corresponds to a height approximately halfway between the heights G1, G7. In other words, the opening 55a is located to minimize the amount of movement of the inner cable Ka with respect to the reference line O when the shift lever 17 is manipulated.

The position of the shift lever 17 is detected as follows.

Figure 15:
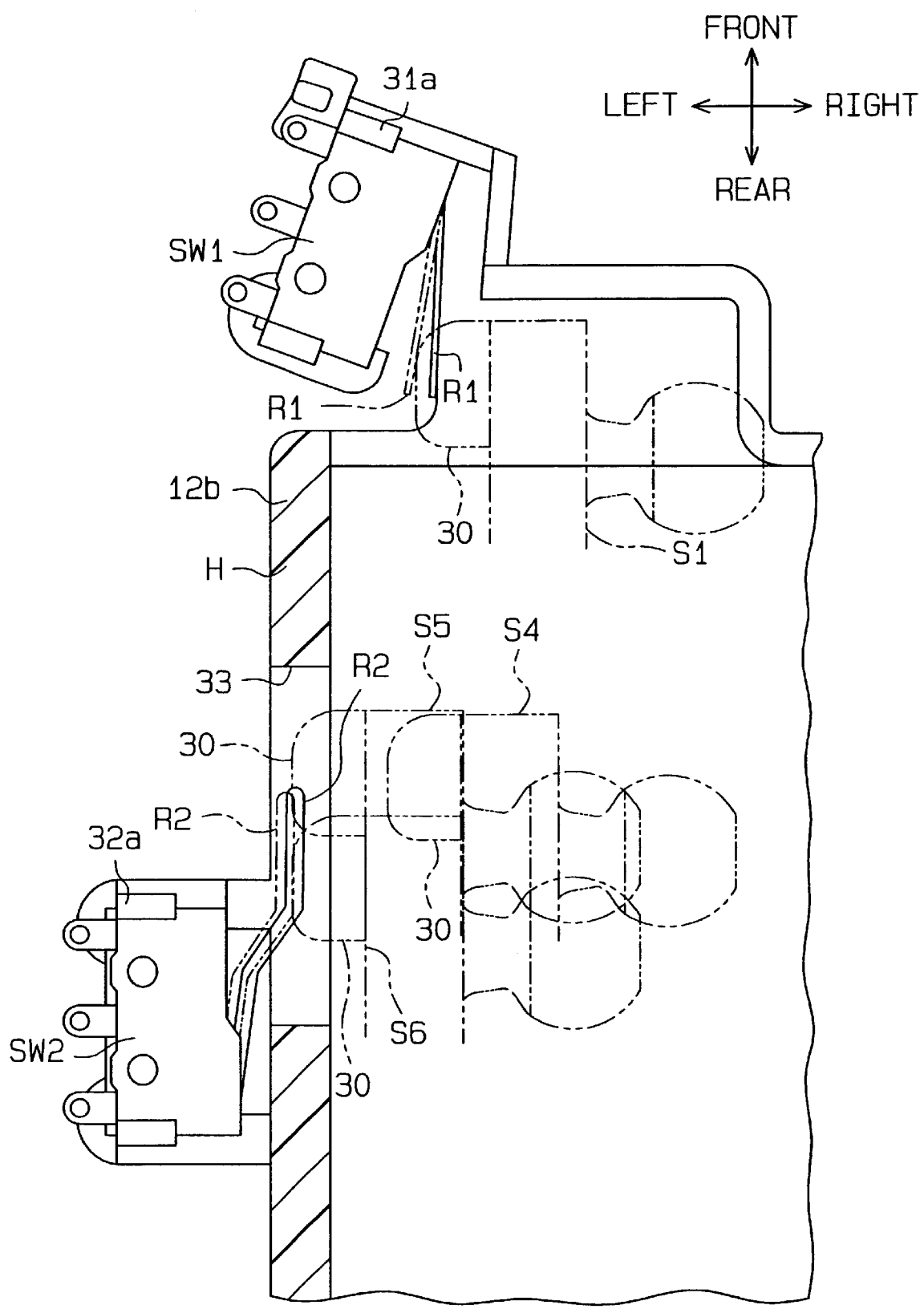
FIG. 15 is a cross-sectional view showing a portion of the case of FIG. 6.
Figure 16:
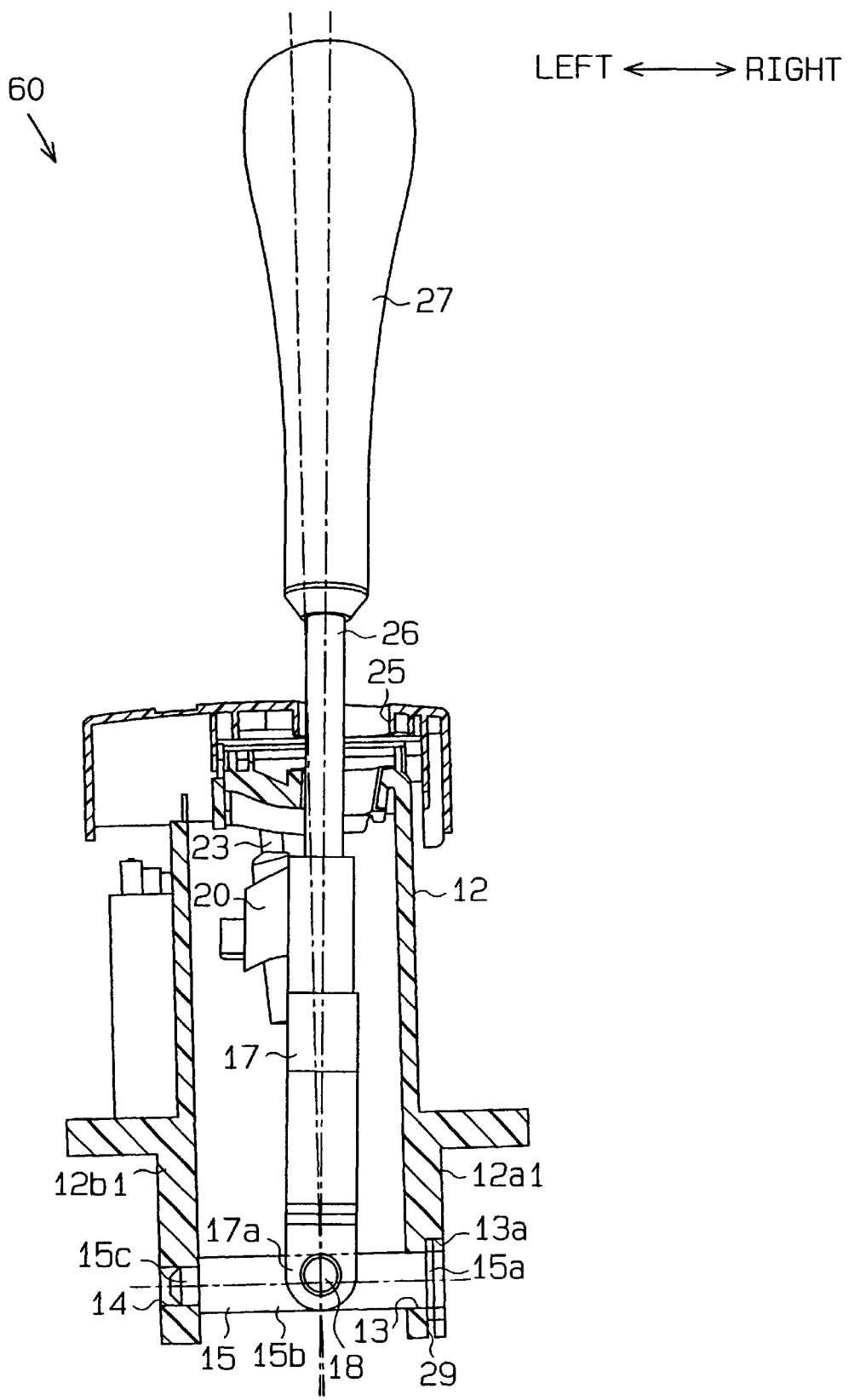
FIG. 16 is a lateral cross-sectional view showing a shift device of a second embodiment according to the present invention.

As shown in FIGS. 6 and 15, a first switch table 31 is located at the front side of the left wall 12b of the housing H and is formed integrally with the base B. A switch mounting portion 31a is formed on the top of the first switch table 31. A first limit switch SW1 is mounted on the switch mounting portion 31a. A first switch lever R1 projects from the right side of the first switch SW1. The first switch lever R1 is pressed toward the first switch SW1 to turn on the first switch SW1. More specifically, if the shift lever 17 is located at the "P" position S1, the switch pressing portion 30 presses the first switch lever R1, thus turning on the first switch SW1.

A second switch table 32 is located on the left wall 12b and is formed integrally with the base B. A switch mounting portion 32a is formed on the top of the second switch table 32. A second switch SW2 is mounted on the switch mounting portion 32a. A second switch lever R2 projects from the right side of the second switch SW2. The second switch lever R2 is pressed toward the second switch SW2 to turn on the second switch SW2.

The second switch lever R2 is received in an opening 33 formed in the left wall 12b of the housing H. When the shift lever 17 is located at the "3" position S5, the switch pressing portion 30 presses the second switch lever R2 through the opening 33, thus turning on the second switch SW2.

When the first switch SW1 is turned on, the shift lever 17 is located at the "P" position S1. When the first switch SW1 is turned off, the shift lever 17 is located at a position other than the position S1. A controller (not shown) controls shift locking, key interlocking, and shift unlocking, in accordance with an ON/OFF signal of the first switch SW1.

When the second switch SW2 is turned on, the shift lever 17 is located at the "3" position 5. If the second switch SW2 is turned off, the shift lever 17 is located at a position other than the position S5. The controller controls the stage of the automatic transmission in accordance with an ON/OFF signal of the second switch SW2.

If the shift lever 17 is located at the "P" position S1 or the "R" position S2 or the "N" position S3 or the "2" position S6 or the "1" position S7, the stage of the automatic transmission is changed in relation to the amount of movement of the inner cable Ka in the direction of the reference line O. The amount of movement of the inner cable Ka corresponds to the distance between the distal end of the inner cable Ka and the opening 55a.

If the shift lever 17 is located at the "D" position S4 or the "3" position S5, the stage of the automatic transmission is changed in relation to the amount of movement of the inner cable Ka in the direction of the reference line O and the ON/OFF signal of the second switch SW2.

More specifically, the amount of movement of the inner cable Ka when the shift lever 17 is shifted to the "D" position S4 is substantially equal to that of the inner cable Ka when the shift lever 17 is shifted to the "3" position S5. Thus, the controller judges whether the shift lever 17 is located at the "D" position S4 or the "3" position S5 in accordance with the ON/OFF signal of the second switch SW2. That is, the controller determines that the shift lever 17 is located at the "D" position S4 if the second switch SW2 is turned off. In contrast, the controller determines that the shift lever 17 is located at the "3" position S5 if the second switch SW2 is turned on.

The operation of the shift device 11 of the first embodiment will hereafter be described.

As described, the moveable pin 23 of the shift lever 17 constantly abuts against the positioning surface 28, which is formed along the corresponding inner wall of the housing H. Every time the movable pin 23 moves beyond any convex portion, an appropriate level of resistance is generated. The driver, who is manipulating the shift lever 17, receives force caused by the resistance. This enables the driver to manipulate the shift lever 17 accurately. The shift lever 17 is thus positioned reliably.

The connecting portion Kb rotates around the axis of the cable connector 21 and slightly moves relative to the axis of the cable connector 21. That is, connection between the connecting portion Kb and the cable connector 21 is flexible. The shift lever 17 is thus smoothly manipulated.

The fore-and-aft position of the shift lever 17 is signaled to the automatic transmission through the inner cable Ka. If the reference line O is offset from the position halfway between the point T1 and the point T2, a judgement of the lateral amount of movement of the inner cable Ka with respect to the reference line O may be erroneous.

For example, if the distance between the reference line O and the point T2 is longer than the distance between the reference line O and the point T1, the following problem will occur.

More specifically, if the distance between the reference line O and the point T1 is relatively small and if the shift rod 26 is shifted to the rightmost position from the position corresponding to the reference line O, the amount of movement of the inner cable Ka with respect to the reference line O becomes relatively small. On the other hand, if the distance between the reference line O and the point T2 is relatively large and if the shift rod 26 is shifted to the leftmost position from the position corresponding to the reference line O, the amount of movement of the inner cable Ka with respect to the reference line O becomes relatively large. As a result, the automatic transmission may receive an inaccurate signal regarding the operation of the shift lever 17.

To avoid this, the position of the opening 55a in the support wall 55 is optimally selected such that the axis of the opening 55a, or the reference line O, corresponds to the position halfway between the point T1 and the point T2. Accordingly, the amount of movement of the inner cable Ka with respect to the reference line O when the distal end of the inner cable Ka is shifted to the rightmost point T1 is substantially equal to that of the inner cable Ka when the distal end of the inner cable Ka is shifted to the leftmost point T2. This substantially reduces errors in the amount of lateral movement of the inner cable Ka with respect to the reference line O.

Further, if the reference line O is offset from the height halfway between the heights G1, G7, a judgement of the amount of vertical movement of the inner cable Ka with respect to the reference line O may be erroneous.

Thus, in the first embodiment, as shown in FIG. 14A, the height of the opening 55a is optimally selected such that the center of the opening 55a, or the reference line O, corresponds to a position halfway between the heights G1, G7. This reduces errors in judgements of the amount of vertical movement of the inner cable Ka with respect to the reference line O.

The shift device 11 prevents the solenoid 41 from being exposed to liquid in the following manner.

If the cover I is exposed to liquid, the liquid may flow along the outer side of the cover I to enter the opening Ia. The liquid then falls on the top plate 12c through the opening Ia. However, as described, the solenoid 41 is encompassed by the front plate 12d1, the right plate 12d2, and the left plate 12d3 of the solenoid accommodating portion S. This structure prevents the solenoid 41 from being exposed to the liquid.

If the liquid enters the guide hole 25b, the liquid flows along the following paths.

If the shift rod 26 is located at the "P" position S1, as shown in FIG. 4, the liquid falls on the cover sheet C through the guide hole 25b. The liquid then flows toward the front end of the cover sheet C and enters the opening Ia of the cover I, thus falling on the top plate 12c. However, the solenoid accommodating portion S, which encompasses the solenoid 41, prevents the solenoid 41 from being exposed to the liquid.

If the shift rod 26 is located at the "N" position S3 or the "D" position S4 or the "3" position S5, the liquid falls on the top plate 12c from the front end of the cover sheet C. However, the solenoid accommodating portion S prevents the solenoid 41 from being exposed to the liquid.

If the shift rod 26 is located at the "R" position S2, the liquid falls on the top plate 12 directly from the front end of the cover sheet C or through the opening Ia. However, the solenoid accommodating portion S protests the solenoid 41 from the liquid.

If the shift rod 26 is located at the "1" position S7, the front end of the cover sheet I corresponds to the position Cb, as shown in FIG. 6. Thus, the liquid falls on the top of the housing H from the front end of the cover sheet C. A front portion of the top of the housing H is slanted toward the front end of the housing H. Thus, the liquid falls on the top plate 12c from the front end of the housing H. However, as described, the solenoid accommodating portion S protects the solenoid 41 from the liquid.

The shift device 11 of the first embodiment has the following advantages.

(1) The case 12 includes the housing H, the base B, and the support wall 55, which are parts of a single body. Accordingly, unlike the prior art, the case 12 is formed in a single mold. This reduces the cost of fabricating the mold, which decreases the manufacturing cost of the shift device 11.

(2) The support wall 55 has the opening 55a. The control cable Ka is thus connected to the case 12 through the opening 55a.

(3) The movable pin 23 of the shift lever 17 constantly abuts against the positioning surface 28, which is formed along the corresponding inner wall of the housing H. Every time the movable pin 23 moves beyond any convex portion, an appropriate level of resistance is generated. The driver feels the resistance. This enables the driver to manipulate the shift lever 17 accurately. The shift lever 17 is thus positioned reliably.

Further, unlike the prior art shift device 71 that has a pair of positioning mechanisms, the shift device 11 of the present invention has the single positioning mechanism. This structure reduces the manufacturing cost of the shift device 11.

(4) The cable connector 21 has the substantial spherical shape, and the connecting portion Kb has the matching recess for receiving the cable connector 21. The connecting portion Kb thus smoothly moves relative to the cable connector 21. This enables the shift lever 17 to be smoothly manipulated.

(5) The position of the opening 55a of the support wall 55 is optimally selected such that the reference line O, or the axis of the opening 55a, corresponds to the position halfway between the point T1 and the point T2. Accordingly, the amount of movement of the inner cable Ka with respect to the reference line O when the distal end of the inner cable Ka is shifted to the rightmost point T1 is substantially equal to that of the inner cable Ka when the distal end of the inner cable Ka is shifted to the leftmost point T2. This reduces errors in the lateral movement amount of the inner cable Ka with respect to the reference line O.

(6) The position of the opening 55a of the support wall 55 is optimally selected such that the axis of the opening 55a, or the reference line O, corresponds to the height intermediate between the height G1 and the height G7. This suppress an error in the vertical movement amount of the inner cable Ka with respect to the reference line O.

(7) The shift lever 17 is formed integrally with the cable connector 21. Thus, unlike the prior art shift device 71 in which the shift lever 74 and the cable connectors 81a are separate, the shift device 11 has fewer parts. This reduces the manufacturing cost of the shift device 11.

(8) The positioning surface 28, which forms part of the positioning mechanism, is formed integrally with the case 12. The positioning surface 28 is thus formed relatively easily. Further, the number of the parts of the shift device 11 is relatively small. Accordingly, the manufacturing cost of the shift device 11 is low.

(9) The shift lever 17 is formed integrally with the projection 20 in which the accommodating hole 22, the cable connector 21, and the switch pressing portion 30 are defined as one body. Thus, as compared to a shift device in which a shift lever, a cable connector, and a switch pressing portion are separate, the shift device 11 of the present invention has fewer parts. This reduces the manufacturing cost of the shift device 11.

(10) The switch pressing portion 30 is formed integrally with the shift lever 17 using a single mold. Further, the switch pressing portion 30 presses both of the switch levers R1, R2 of the first and second switches SW1, SW2. That is, the first and second switches SW1, SW2 are operated with a single component, or the switch pressing portion 30. This reduces the manufacturing cost of the shift device 11.

(11) Since the accommodating hole 22, the cable connector 21, and the switch pressing portion 30 are all formed in the projection 20, the space in the shift device 11 is saved. The shift device 11 is thus relatively compact.

(12) The shift lever 17 is supported directly by the support shaft 15 and the pin 18. Thus, unlike the prior art shift device 71, which has the sleeve 81, the shift device 11 does not need a sleeve. Accordingly, the shift device 11 has fewer parts, and the manufacturing cost of the shift device 11 is low.

(13) In the first embodiment, the base B is formed integrally with the top plate 12c, the front plate 12d1, the right plate 12d2, and the left plate 12d3 of the solenoid accommodating portion S. Thus, even when the cover I is exposed to liquid, the solenoid 41 is prevented from being exposed to the liquid. Accordingly, the solenoid 41 operates reliably.

(14) In the first embodiment, the base B is formed such that the bottom of the solenoid 41 does not project downward with respect to the bottom of the base B. Accordingly, when the base B is secured to the vehicle floor, the solenoid 41 does not interfere with the floor or other components installed on the floor.

A shift device 60 of a second embodiment according to the present invention will hereafter be described. The shift device 60 is different from the shift device 11 of the first embodiment in terms of the support shaft 15, which supports the shift lever 17, and the shaft holes 13, 14.

Figure 17:
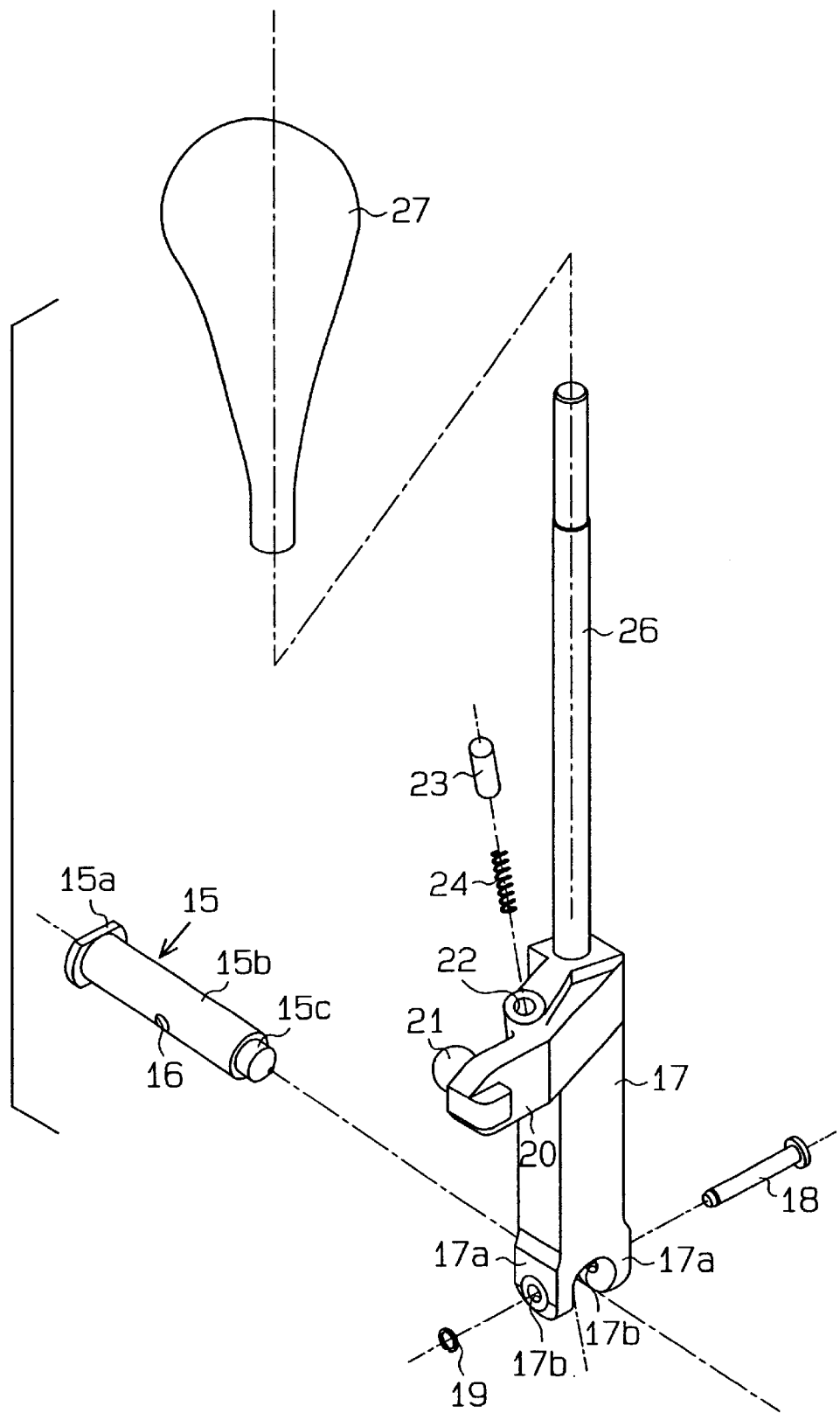
FIG. 17 is an exploded perspective view showing a shift lever of the shift device of FIG. 16.

As shown in FIG. 17, the support shaft 15 has a shaft portion 15b, a head 15a, and a projection 15c. The head 15a is formed at the proximal end of the shaft 15, and the projection 15c is formed at the distal end of the shaft 15. The diameter of the head 15a is larger than that of the shaft portion 15b, and the diameter of the projection 15c is smaller than that of the shaft portion 15b. The head 15a has a pair of parallel flat surfaces that are spaced from each other at an interval equal to the diameter of the shaft portion 15b. The projection 15c includes a distal portion tapered toward the distal end of the projection 15c such that the projection 15c is easily fitted in the shaft hole 14. The support shaft 15 has a pin hole 16 perpendicular to the axis of the support shaft 15. A longitudinal direction of the head 15a is substantially parallel with the pin hole 16.

Figure 18A:
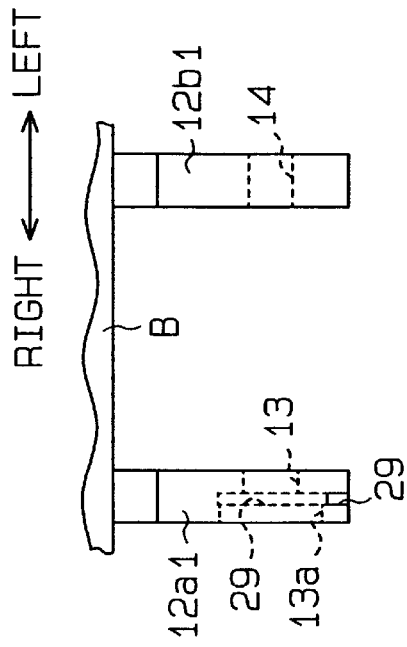
FIG. 18A is a partial side view of a bearing piece of the shift device of FIG. 16.
Figure 18B:
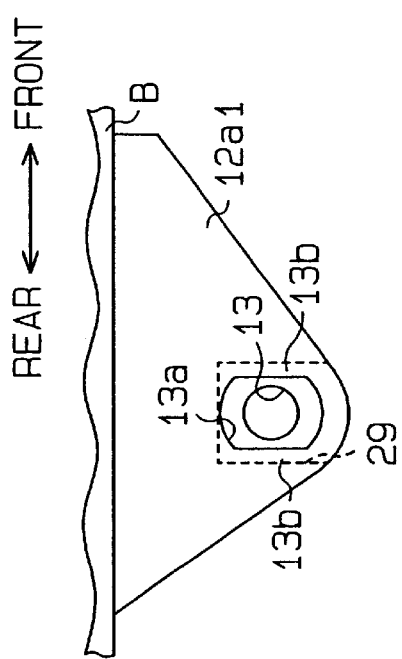
FIG. 18B is a partial front view of a bearing piece of the shift device of FIG. 18A.
Figure 18C:
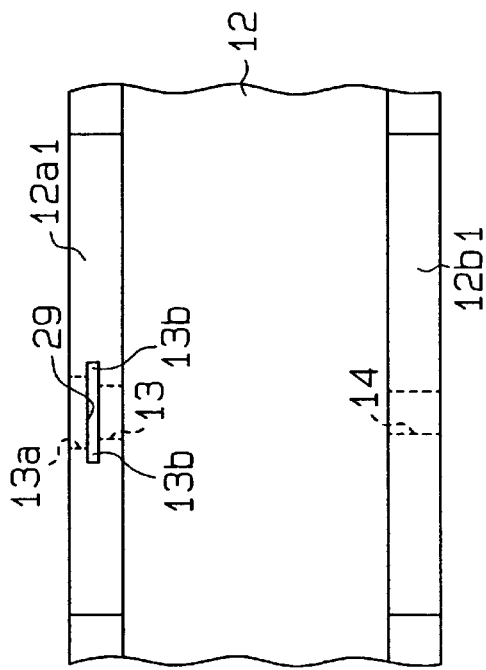
FIG. 18C is a partial bottom view of a bearing piece of the shift device of FIG. 18A.

As shown in FIGS. 18A, 18B, and 18C, the right bearing piece 12a1 has an elongated hole 13a, or an attachment hole. The elongated hole 13a receives the head 15a of the support shaft 15. The shape of the elongated hole 13a matches the cross-sectional shape of the head 15a and includes a pair of flat surfaces. Each flat surface of the elongated hole 13a is substantially perpendicular to the base B.

The bearing piece 12a1 also has a slit 29. The slit 29 opens in the lower end of the bearing piece 12a1 and extends toward to the upper end of the bearing piece 12a1 to define a uniform fore-and-aft dimension. The slit 29 is connected to the shaft hole 13 and the elongated hole 13a. As shown in FIG. 18B, the upper end of the slit 29 is located slightly upward from the upper end of the elongated hole 13a. The interval between the front and rear ends of the slit 29 is larger than the interval between the upper and lower ends of the elongated hole 13a (the longitudinal dimension of the head 15a of the support shaft 15). The lateral dimension of the slit 29 (in the rightward or leftward direction) is slightly larger than the axial dimension of the head 15a. A step 13b is formed between the elongated hole 13a and the slit 29.

As shown in FIGS. 20A to 20D, the support shaft 15 is passed through the shaft hole 13 such that the projection 15c is fitted in the shaft hole 14. The support shaft 15 is then rotated at an angle other than a multiple of 180 degrees. The head 15a thus engages with the step 13b in the slit 29. In this state, the step between the shaft portion 15b and the projection 15c abuts against the inner wall of the bearing piece 12ba. The support shaft 15 is thus positioned. In other words, the bearing pieces 12a1, 12b1 support the support shaft 15 with the head 15a engaged with the step 13b and the projection 14c fitted in the shaft hole 14. The support shaft 15 thus does not fall from the bearing pieces 12a1, 12b1.

FIG. 19 shows shift positions in association with the position of the head 15a. The position of the axis of the shift rod 26 when the shift rod 26 is located at the "P" position is indicated by the single-dotted broken line S1, and the corresponding position of the head 15a is indicated by the double-dotted broken line B1. In the same manner, the position of the axis of the shift rod 26 when the shift rod 26 is located at the "1" position is indicated by the single-dotted broken line S2, and the corresponding position of the head 15a is indicated by the double-dotted broken line B2.

The interval between the "P" position and the "1" position covers the whole movement range of the shift rod 26. When the shift rod 26 is located at the "P" position, the head 15a does not entirely correspond to the elongated hole 13a. That is, the head 15a is maintained as engaged with the step 13b. In the same manner, when the shift rod 26 is located at the "1" position, the head 15a does not entirely correspond to the elongated hole 13a. That is, the head 15a is maintained as engaged with the step 13b. Accordingly, in either case, the head 15a does not fall from the elongated hole 13a, thus preventing the support shaft 15 from falling from the case 12 during the movement of the shift rod 26.

The support shaft 15 of the second embodiment is installed in the case 12 in the following manner.

First, as shown in FIG. 17, the coil spring 24 and the movable pin 23 are accommodated in the accommodating hole 22 of the shift lever 17. The shift lever 17 is then inserted in the case 12 from below such that the distal portion of the shift lever 17 projects from the case 12 through the guide hole 25. A knob 27 is secured to the distal end of the shift lever 17.

Figure 20A:
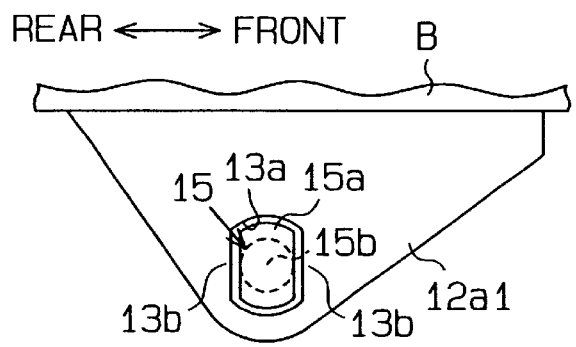
FIG. 20A is a partial side view of the bearing piece and the support shaft of the shift device of FIG. 16.
Figure 20B:
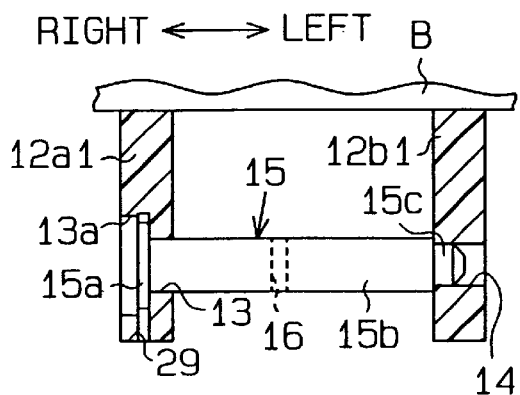
FIG. 20B is a partial front view of the bearing piece and the support shaft of the shift device of FIG. 20A.

As shown in FIGS. 20A and 20B, the projection 15c of the support shaft 15 is passed through the shaft hole 13 such that the head 15a corresponds to the elongated hole 13a. Since the projection 15c includes the tapered distal portion, the projection 15c is easily passed through the shaft hole 13 and the space between the yoke members 17a and is fitted in the shaft hole 14. When the step between the shaft portion 15b and the projection 15c contacts the inner wall of the left bearing piece 12b1, the head 15a exits the elongated hole 13a and enters the slit 29.

Figure 20C:
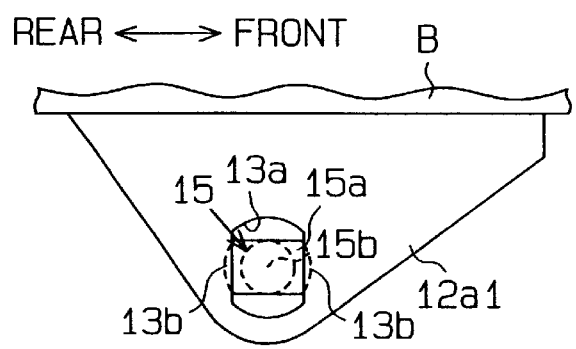
FIG. 20C is a partial side view of the bearing piece and the support shaft of the shift device of FIG. 20A.
Figure 20D:
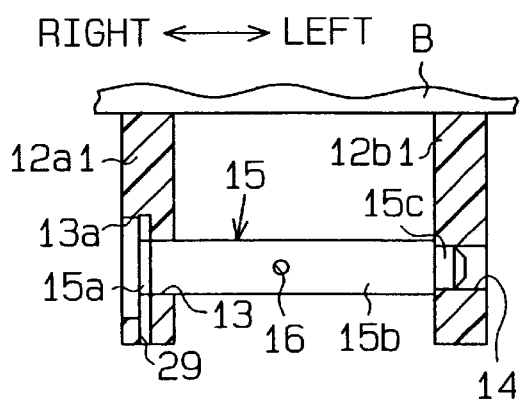
FIG. 20D is a partial front view of the bearing piece and the support shaft of the shift device of FIG. 20A.

Subsequently, as shown in FIGS. 20C and 20D, the support shaft 15 is rotated at approximately 90 degrees around its axis. The head 15a thus engages with the step 13b and is received in the slit 29. Accordingly, the support shaft 15 is installed in the case 12.

Afterward, the pin 18 is passed through the pin holes 17b of the shift lever 17 and the pin hole 16 of the support shaft 15. The C-ring 19 is then fitted around the distal end of the pin 18. Accordingly, the shift lever 17 is installed in the case 12.

The shift device 60 of the second embodiment has the following advantages.

(15) In the prior art shift device 71, the C-ring 79 prevents the shaft 80 escaping from the bearing pieces 77a, 77b. Further, the shaft 80 supports the shift lever 74 through the sleeve 81. In contrast, in the second embodiment of the present invention, the engagement between the head 15a and the step 13b prevents the support shaft 15 from separating from the bearing piece 12a1. Also, the support shaft 15 directly supports the shift lever 17. In other words, since the second embodiment does not need components corresponding to the C-ring 79 or the sleeve 81, the shift device 60 requires fewer parts. This lowers the manufacturing cost of the shift device 60.

(16) The head 15a of the support shaft 15 has a pair of arched surfaces and a pair of flat surfaces. The shape of the elongated hole 13a matches that of the head 15a. That is, the head 15a and the elongated hole 13a have a non-circular shape. Thus, when the head 15a entirely corresponds to the elongated hole 13a, the head 15a may pass through the elongated hole 13a. However, if the head 15a is received in the slit 29 and is rotated such that the head 15a does not entirely correspond to the elongated hole 13a, the support shaft 15 is prevented from falling from the elongated hole 13a.

(17) In the second embodiment, the projection 15c at the distal end of the support shaft 15 is fitted in the shaft hole 14. The support shaft 15 is thus positioned when the step between the shaft portion 15b and the projection 15c abuts against the inner wall of the bearing piece 12b1. That is, the support shaft 15 is positioned easily and reliably.

(18) In the second embodiment, the pin 18 supports the shift lever 17 such that the shift lever 17 pivots laterally. The support shaft 15 supports the shift lever 17 such that the shift lever pivots in the fore-and-aft direction. The support structure of the shift lever 17 is thus relatively simple.

(19) The distal portion of the projection 15c of the support shaft 15 has a substantial conical shape. The projection 15c is thus easily passed through the shaft hole 13 and the space between the yoke members 17a of the shift lever 17 and is fitted in the shaft hole 14.

A shift device of a third embodiment according to the present invention will be described with reference to FIGS. 21 to 23. The third embodiment is different from the second embodiment in terms of the shaft holes 13, 14, the elongated hole 13a, and the support shaft 15.

Figure 21A:
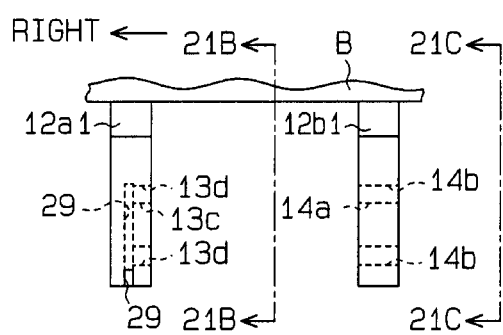
FIG. 21A is a front view showing a bearing piece of a shift device of a third embodiment according to the present invention.
Figure 21B:
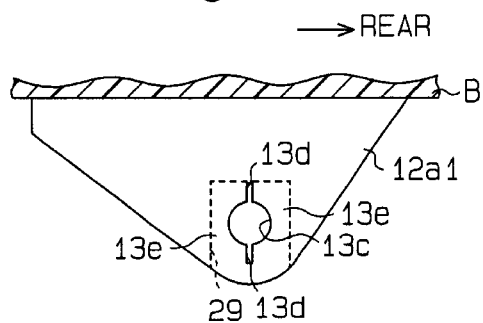
FIG. 21B is a cross-sectional view taken along line 21B—21B of FIG. 21A.
Figure 21C:
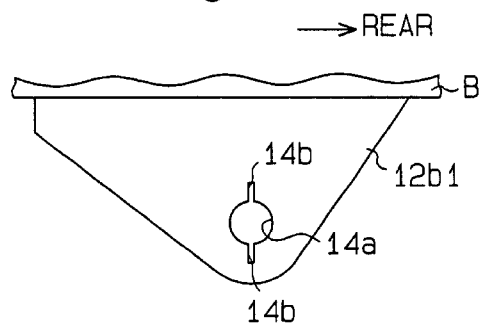
FIG. 21C is a side view of the bearing piece of FIG. 21A as viewed from line 21C—21C of FIG. 21A.

As shown in FIGS. 21A to 21C, an opening, or an attachment hole 13c, is formed in the inner wall of the right bearing piece 12a1 and is connected to the slit 29. The opening 13c does not open in the outer wall of the bearing piece 12a1. The left bearing piece 12b1 has a shaft hole 14a that matches the opening 13c. The shaft hole 14a extends through the bearing piece 12b1.

The opening 13c includes upper and lower, radial cut-away portions 13d. The cut-away portions 13d are identical and coaxial. In the same manner, the shaft hole 14a has upper and lower, radial cut-away portions 14b. The cut-away portions 14b are identical and coaxial. A step 13e is formed between the slit 29 and the portion of the opening 13c that does not include the cut-away portions 13d.

Figure 22:
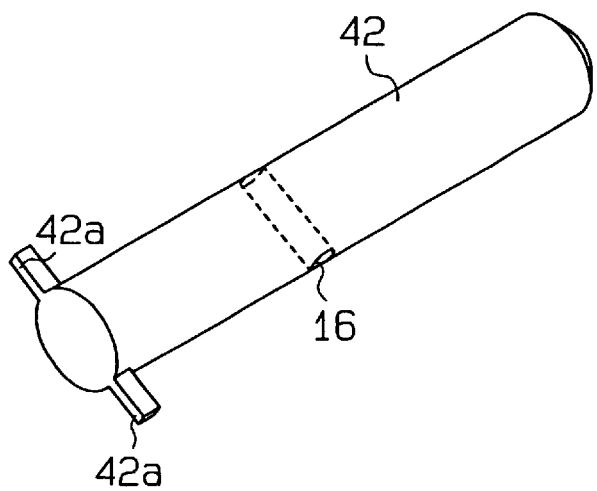
FIG. 22 is a perspective view showing a support shaft of the shift device of the third embodiment.

As shown in FIG. 22, a support shaft 42 has a pair of radial engagement projections 42a. The engagement projections 42a are identical and coaxial. The support shaft 42 has the pin hole 16 that receives the pin 18. The opening 13c and the shaft hole 14a rotationally support the support shaft 42. The engagement projections 42a of the support shaft 42 are fitted in the slit 29. Thus, engagement between the engagement projections 42a and the step 13e prevents the support shaft 42 from falling from the case 12.

The support shaft 42 of the third embodiment is installed in the case 12 as follows.

The support shaft 42 is first passed through the shaft hole 14a from the outer wall of the left bearing piece 12b1 such that the engagement projections 42a correspond to the cut-away portions 14b. The support shaft 42 is then fitted in the opening 13c from the inner wall of the right bearing piece 12a1 such that the engagement projections 42a correspond to the cut-away portions 13d. The engagement projections 42a thus enter the slit 29.

Figure 23A:
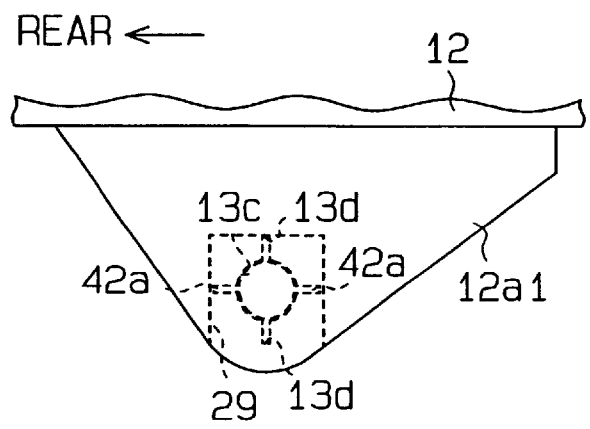
FIG. 23A is a side view showing a bearing piece of the shift device of the third embodiment that supports a support shaft in a rotated state.
Figure 23B:
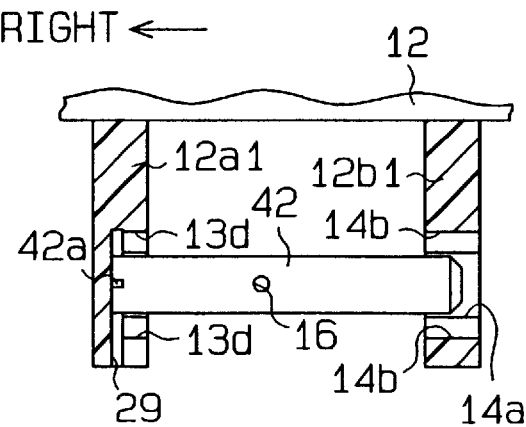
FIG. 23B is a cross-sectional view showing the bearing piece of FIG. 23A.

Subsequently, as shown in FIGS. 23A and 23B, the support shaft 42 is rotated at approximately 90 degrees around its axis. The engagement projections 42a thus move in the slit 29 and engage with the step 13e. Accordingly, the support shaft 42 is installed in the case 12. The engagement between the engagement projections 42a and the step 13e prevents the support shaft 42 from falling from the bearing pieces 12a1, 12b1.

As a result, the third embodiment of the present invention has the same advantages as the items (15), (16), and (18) of the second embodiment.

The illustrated embodiments may be modified as follows.

In the first to third embodiments, the guide holes 25a, 25b may have a linear shape.

In the first embodiment, the support wall 55 may be formed separately from the case 12.

In the first embodiment, the shift device 11 does not necessarily have to include the positioning mechanism.

In the first embodiment, the positioning surface 28 may be formed separately from the case 12.

In the first to third embodiments, a resilient member such as a belleville spring may replace the movable pin 23 and the coil spring 24 as a positioning component.

In the first embodiment, the cable connector 21 may have other shapes than the spherical shape.

In the first embodiment, the opening 55a of the support wall 55 may be located at a different position.

In the first to third embodiments, the shift lever 17 does not necessarily have to move in directions perpendicular to each other. For example, the shift lever 17 may be moved linearly or in different directions inclined with respect to each other or along a curve.

In the first to third embodiments, the shift lever 17 that has the movable pin 23 formed integrally with the cable connector 21 may be employed in a shift device for an automatic transmission with a linear guide hole.

In the first embodiment, a pillar-like cable connector may replace the spherical cable connector 21.

In the first to third embodiments, the switch pressing portion 30 and the shift lever 17 do not necessarily have to be formed as one body. Instead, the switch pressing portion 30 and the shift lever 17 may be formed separately before being assembled together.

In the second embodiment, the axial position of the head 15a in the support shaft 15 may be changed.

In the third embodiment, the axial position of each engagement projection 42a of the support shaft 42 may be changed. In this case, the opening 13c must open in the outer wall of the right bearing piece 12a1.

In the third embodiment, the circumferential position of each engagement projection 42a of the support shaft 42 may be changed. In this case, the cut-away portions 13d, 14b must be located at positions corresponding to the positions of the projections 42a.

In the third embodiment, the number of the engagement projections 42a may be changed. If this is the case, the positions and the number of the cut-away portions 13d, 14b must match the positions and the number of the projections 42a.

In the second embodiment, the head 15a and the elongated hole 13a do not necessarily have to have an identical cross-sectional shape. For example, while the shape of the elongate hole 13a is maintained as indicated in FIG. 18A, the shape of the head 15a of the support shaft 15 may be modified from that of FIG. 17. More specifically, the head 15a may include only one projecting piece. In other words, the head 15a or the elongated hole 13a may have different cross-sectional shapes as long as the following conditions are met. That is, the head 15a and the elongated hole 13a must have a non-circular shape. The elongated hole 13a must be capable of receiving the head 15a. The head 15a must engage with the periphery of the elongated hole 13a when rotated at a predetermined angle in the elongated hole 13a.

The present examples and embodiments are to be considered as illustrative and not restrictive and the invention is not to be limited to the details given herein, but may be modified within the scope and equivalence of the appended claims.

What is claimed is:

1. A shift device for shifting an automatic transmission of a vehicle, comprising:
   a shift lever, wherein the shift lever is moved among a plurality of shift positions; and
   a case, wherein the case receives a lower portion of the shift lever, and the case includes:
      a housing, wherein the housing accommodates the lower portion of the shift lever and has a guide hole that guides the movement of the shift lever;
      a base, wherein the base is formed integrally with the housing and is attached to the vehicle; and
      a positioning mechanism, wherein the positioning mechanism includes:
         a positioning surface, which is located in the case, wherein the positioning surface has a plurality of concave portions for positioning the shift lever; and
         a positioning component, which is located in the shift lever, wherein the positioning component is moved among the concave portions and is pressed against the positioning surface;
      wherein the shift lever pivots in a first direction and a second direction transverse to the first direction, and the concave portions include:
         a plurality of first concave portions, which extend in the first direction; and
         a plurality of second concave portions, which extend in the second direction, wherein the first concave portions are formed integrally with the second concave portions.

2. The shift device according to claim 1, wherein the case further includes a cable holder that holds a control cable for connecting the shift lever to the automatic transmission.

3. The shift device according to claim 1, wherein the positioning mechanism further includes a plurality of convex portions each of which is located between the corresponding concave portions, and the positioning mechanism causes a predetermined resistance when the shift lever is moved from a certain shift position to an adjacent shift position.

4. The shift device according to claim 1, wherein the positioning component includes a movable pin that moves in accordance with the shape of the positioning surface and a spring that urges the movable pin toward the positioning surface.

5. The shift device according to claim 1, wherein the shift lever pivots between a first restriction position and a second restriction position in the first direction, and when the shift lever is located at the first restriction position, the distal end of the control cable is located at a first height, and when the shift lever is located at the second restriction position, the distal end of the control cable is located at a second height, wherein the control cable is located at a position halfway between the first and second heights at a position corresponding to the cable holder.

6. The shift device according to claim 5, wherein the shift lever pivots between a third restriction position and a fourth restriction position in the second direction and has a connector connected to the distal end of the control cable, and when the shift lever is located at the third restriction position, the distal end of the control cable is located at a first position, and when the shift lever is located at the fourth restriction position, the distal end of the control cable is located at a second position, wherein the position at which the cable holder holds the control cable corresponds to a position halfway between the first position and the second position in the second direction.

7. A shift device for shifting an automatic transmission of a vehicle, comprising:
   a shift lever, wherein the shift lever is moved among a plurality of shift positions;
   a cable connector, which is connected to a control cable that transmits the movement of the control cable to the automatic transmission, wherein the cable connector is formed integrally with the shift lever and the cable connector has a spherical projection;
   a case, wherein the case receives a proximal portion of the shift lever and the cable connector; and
   a positioning mechanism, wherein the positioning mechanism permits the shift lever to be manipulated accurately, and the positioning mechanism includes:
      a positioning surface, which is located in the case, wherein the positioning surface includes a plurality of concave portions; and
      a positioning component, which is located in the shift lever, wherein the positioning component is pressed against the positioning surface.

8. The shift device according to claim 7, further comprising:
   a plurality of limit switches, which are located in the case, wherein the limit switches are selectively turned on in accordance with the position of the shift lever, and the state of each limit switch and the position of the control cable are transmitted to the automatic transmission as the shift position of the shift lever; and
   a switch pressing portion, which is formed integrally with the shift lever, wherein the switch pressing portion presses at least one limit switch in accordance with the shift position of the shift lever for turning on or turning off the limit switch.

9. The shift device according to claim 8, wherein the shift lever pivots in a first direction and a second direction that crosses the first direction.

10. The shift device according to claim 8, wherein the shift lever includes a projection in which the positioning component, the cable connector, and the switch pressing portion are formed as one body.

11. The shift device according to claim 7, further comprising:
    a case, wherein the case receives a proximal end of the shift lever; and
    a support shaft, wherein the case rotationally supports the support shaft, and the support shaft supports the shift lever such that the shift lever pivots with respect to the axis of the support shaft.

12. The shift device according to claim 11, further comprising a pin, wherein the pin connects the support shaft to the shift lever and supports the shift lever such that the shift lever pivots in a direction perpendicular to the axis of the support shaft.

13. A base for a shift device with an electric component, wherein the base is secured to a vehicle body, wherein the base comprises an accommodating portion, wherein the accommodating portion is formed integrally with the base for accommodating the electric component, wherein the accommodating portion includes a top plate that covers at least an upper portion of the electric component, and the electric component is secured to the top plate and wherein the accommodating portion has a bottom opening through which the electric component is received.

14. The base according to claim 13, further comprising a housing, wherein the housing is formed integrally with the base and includes a guide hole that receives a proximal portion of a shift lever of the shift device and guides movement of the shift lever.

15. The base according to claim 13, wherein the electric component has a lower side, and the base has a bottom that is flush with or is located lower than the lower side of the electric component.

16. A support structure for rotationally supporting a shift lever that shifts an automatic transmission of a vehicle, wherein a case receives a proximal portion of the shift lever, and the support structure comprises:
   a support shaft, wherein the support shaft has a distal end and a proximal end and is connected to a proximal end of the shift lever;
   an engagement piece, wherein the engagement piece is formed integrally with the support shaft and projects radially from the support shaft; and
   first and second bearing pieces, which are located in the case, wherein the first and second bearing pieces rotationally support the support shaft, at least one bearing piece has a slit for accommodating the engagement piece and an attachment hole connected to the slit, a step is formed between the slit and the attachment hole, the engagement piece moves in the slit when the support shaft rotates around the axis of the support shaft, the support shaft becomes inseparable from the first and second bearing pieces through the attachment hole when the engagement piece engages with the step at a predetermined engagement position in the slit, and the support shaft becomes separable from the first and second bearing pieces through the attachment hole when the engagement piece is located at a position other than the engagement position in the slit;
   wherein the engagement piece is formed at the proximal end of the support shaft, the attachment hole and the slit are formed in the first bearing piece, the first bearing piece has a first shaft hole that is connected to the attachment hole and the slit and receives the proximal end of the support shaft, and the second bearing piece has a second shaft hole that receives the distal end of the support shaft; and
   wherein the diameter of the second shaft hole is smaller than that of the first shaft hole, the engagement piece is formed at the proximal end of the support shaft, and the support shaft includes a distal projection that is formed at the distal end of the support shaft and has a diameter substantially equal to the diameter of the second shaft hole.

17. The support structure for the shift lever according to claim 16, wherein the attachment hole has a non-circular shape and the engagement piece has a matching non-circular cross-sectional shape.

18. The support structure for the shift lever according to claim 16, wherein each bearing piece has an inner side that faces the inner side of the other bearing piece, each bearing piece has an outer side that opposes its inner side, the attachment hole connects the outer side of the first bearing piece to the slit, and, when installing the support shaft in the case, the distal end of the support shaft is passed through the attachment hole from the outer side of the first bearing piece such that the engagement piece is received in the slit through the attachment hole.

19. The support structure for the shift lever according to claim 14, wherein each bearing piece has an inner side that faces the inner side of the other bearing piece, the attachment hole connects the inner side of the first bearing piece to the slit, and, when installing the support shaft in the case, the proximal end of the support shaft is passed through the attachment hole from the inner side of the first bearing piece such that the engagement piece is received in the slit through the attachment hole.

20. The support structure for the shift lever according to claim 16, wherein the shift lever is connected to the support shaft with the engagement piece located at the engagement position.

21. The support structure for the shift lever according to claim 16, wherein the support shaft has a pin hole perpendicular to the axis of the support shaft, and the support structure further includes a pin that is received in the pin hole to connect the support shaft to the proximal end of the shift lever.

22. A shift device for shifting an automatic transmission of a vehicle, comprising:
   a shift lever, wherein the shift lever is moved among a plurality of shift positions;
   a cable connector, wherein the cable connector is formed integrally with the shift lever and is connected to a control cable that transmits the movement of the shift lever to the automatic transmission;
   a case, wherein the case receives a proximal portion of the shift lever and the cable connector, and the case includes:
      a housing, wherein the housing accommodates a portion of the shift lever and has a guide hole that guides the movement of the shift lever; and
      a base, wherein the base is formed integrally with the housing and is attached to the vehicle;
   a positioning mechanism, wherein the positioning mechanism enables the shift lever to be manipulated accurately and includes:
      a positioning surface, which is located in the case, wherein the positioning surface has a plurality of concave portions for positioning the shift lever; and
      a positioning component, which is located in the shift lever, wherein the positioning component is pressed against the positioning surface;
   a support shaft, wherein the support shaft has a distal end and a proximal end and is connected to a proximal end of the shift lever;
   an engagement piece, wherein the engagement piece is formed integrally with the support shaft and projects radially from the support shaft; and
   first and second bearing pieces, which are located at a lower side of the base, wherein the first and second bearing pieces rotationally support the support shaft, at least one bearing piece has a slit for receiving the engagement piece and an attachment hole connected to the slit, a step is formed between the slit and the attachment hole, the engagement piece moves in the slit when the support shaft rotates around the axis of the support shaft, the support shaft becomes inseparable from the first and second bearing pieces through the attachment hole when the engagement piece engages with the step at a predetermined engagement position in the slit, and the support shaft becomes separable from the first and second bearing pieces through the attachment hole when the engagement piece is located at a position other than the predetermined engagement position in the slit.

23. The shift device according to claim 22, further comprising a top plate, wherein the top plate is formed integrally with the base and has an accommodating portion for accommodating an electric component, the accommodating portion accommodates at least an upper portion of the electric component, and the electric component is secured to the top plate.

* * * * *

UNITED STATES PATENT AND TRADEMARK OFFICE
CERTIFICATE OF CORRECTION

PATENT NO. : 6,662,678 B2
DATED : December 16, 2003
INVENTOR(S) : Shigetoshi Tomida It is certified that error appears in the above-identified patent and that said Letters Patent is hereby corrected as shown below:

Column 8,
Line 50, after "the" and before "control", delete "–".

Column 9,
Line 48, after "position", delete "5", and insert therefor -- S5 --.

Column 20,
Line 12, delete "claim 14", and insert therefor -- claim 16 --.

Signed and Sealed this

Fourth Day of May, 2004

JON W. DUDAS
*Acting Director of the United States Patent and Trademark Office*